May 15, 1934.  J. B. WINTERCORN  1,958,982
DYNAMIC BALANCING OF TUBULAR SHAFTING FOR TRANSMISSION OF POWER PURPOSES
Filed Sept. 1, 1928  7 Sheets-Sheet 1
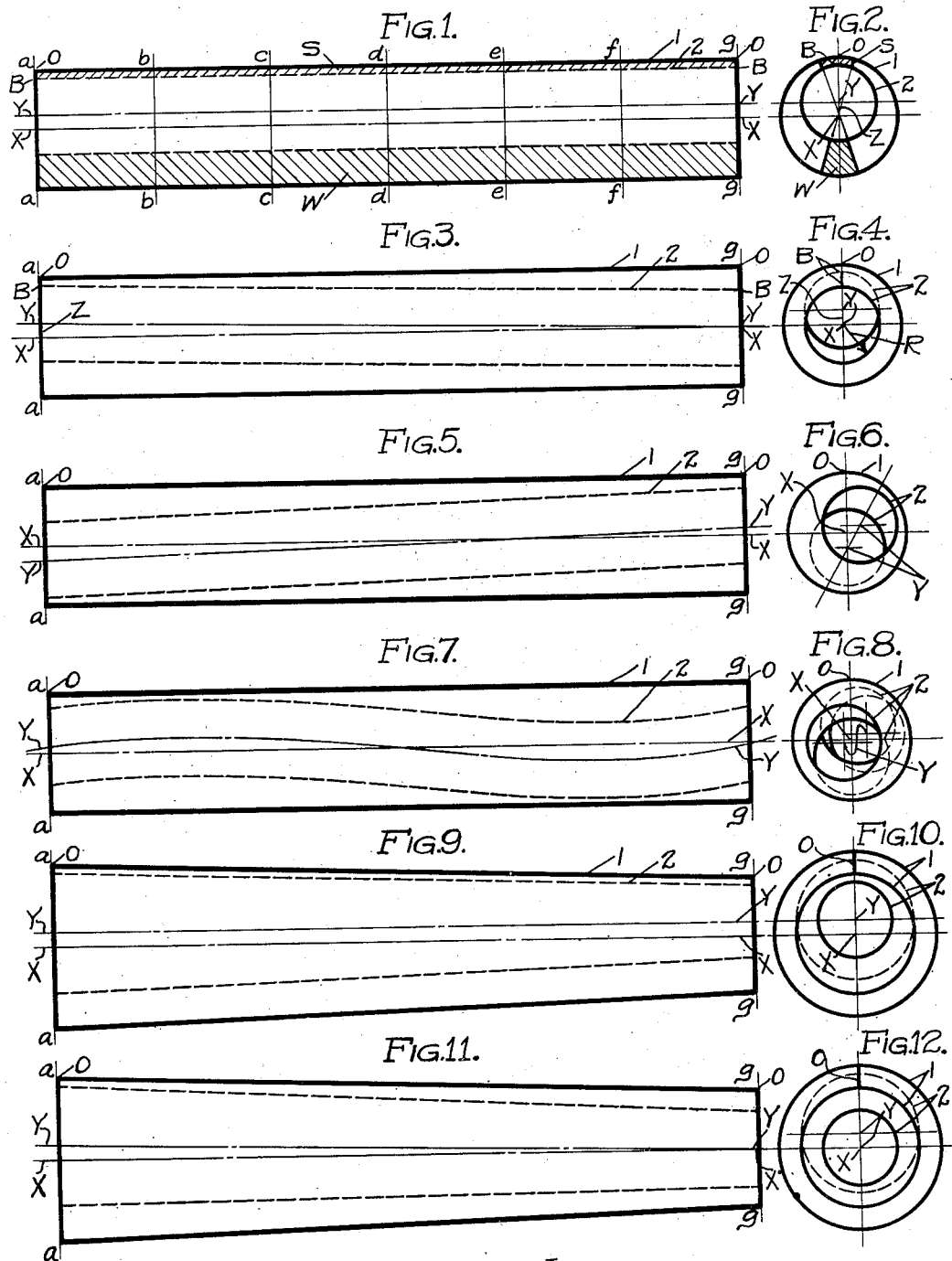

May 15, 1934. J. B. WINTERCORN 1,958,982
DYNAMIC BALANCING OF TUBULAR SHAFTING FOR TRANSMISSION OF POWER PURPOSES
Filed Sept. 1, 1928 7 Sheets-Sheet 2
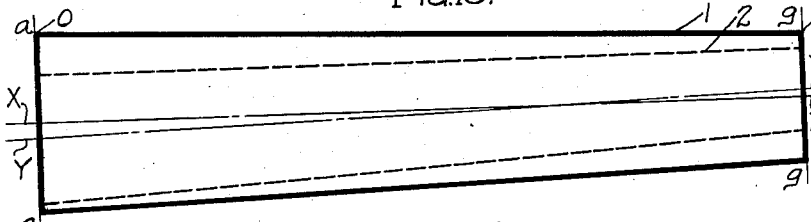
Fig.13. 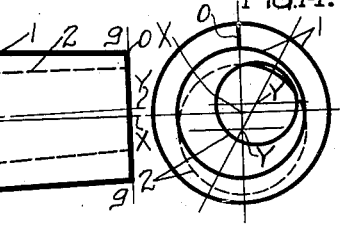 Fig.14.
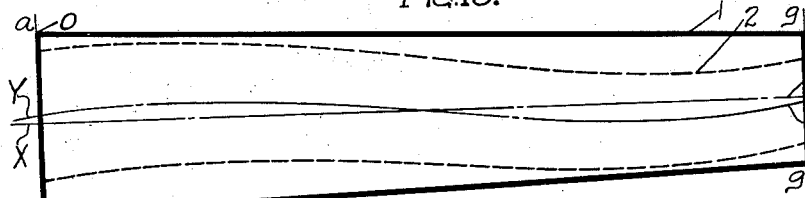
Fig.15. 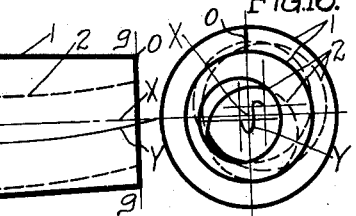 Fig.16.
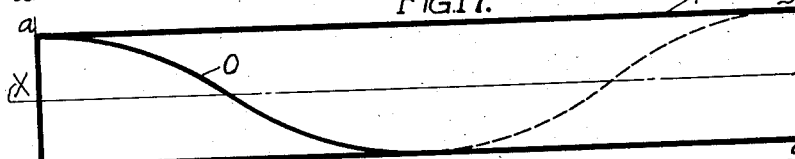
Fig.17. 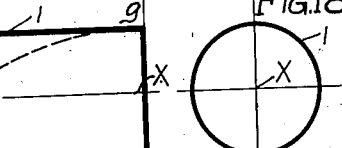 Fig.18.
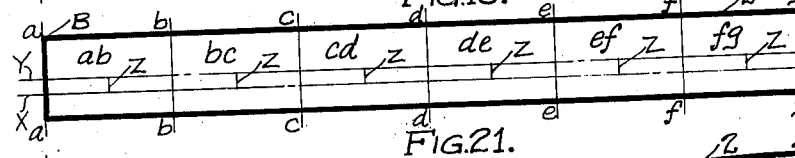
Fig.19. 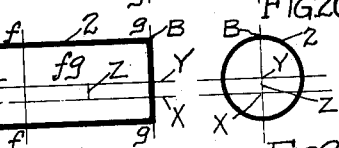 Fig.20.
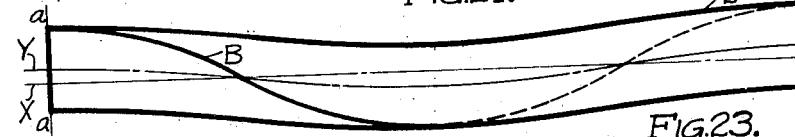
Fig.21. 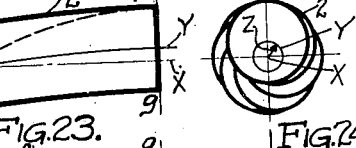 Fig.22.
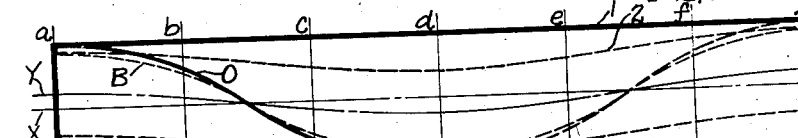
Fig.23. 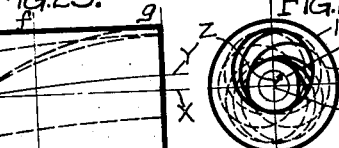 Fig.24.
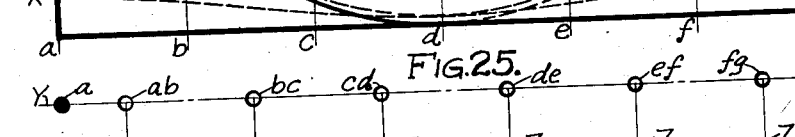
Fig.25. 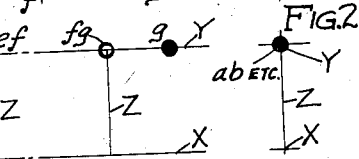 Fig.26.
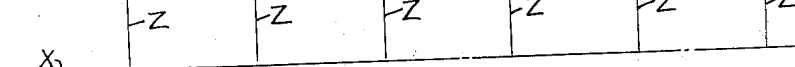
INVENTOR
John B. Wintercorn May 15, 1934.  J. B. WINTERCORN  1,958,982
DYNAMIC BALANCING OF TUBULAR SHAFTING FOR TRANSMISSION OF POWER PURPOSES
Filed Sept. 1, 1928    7 Sheets-Sheet 3
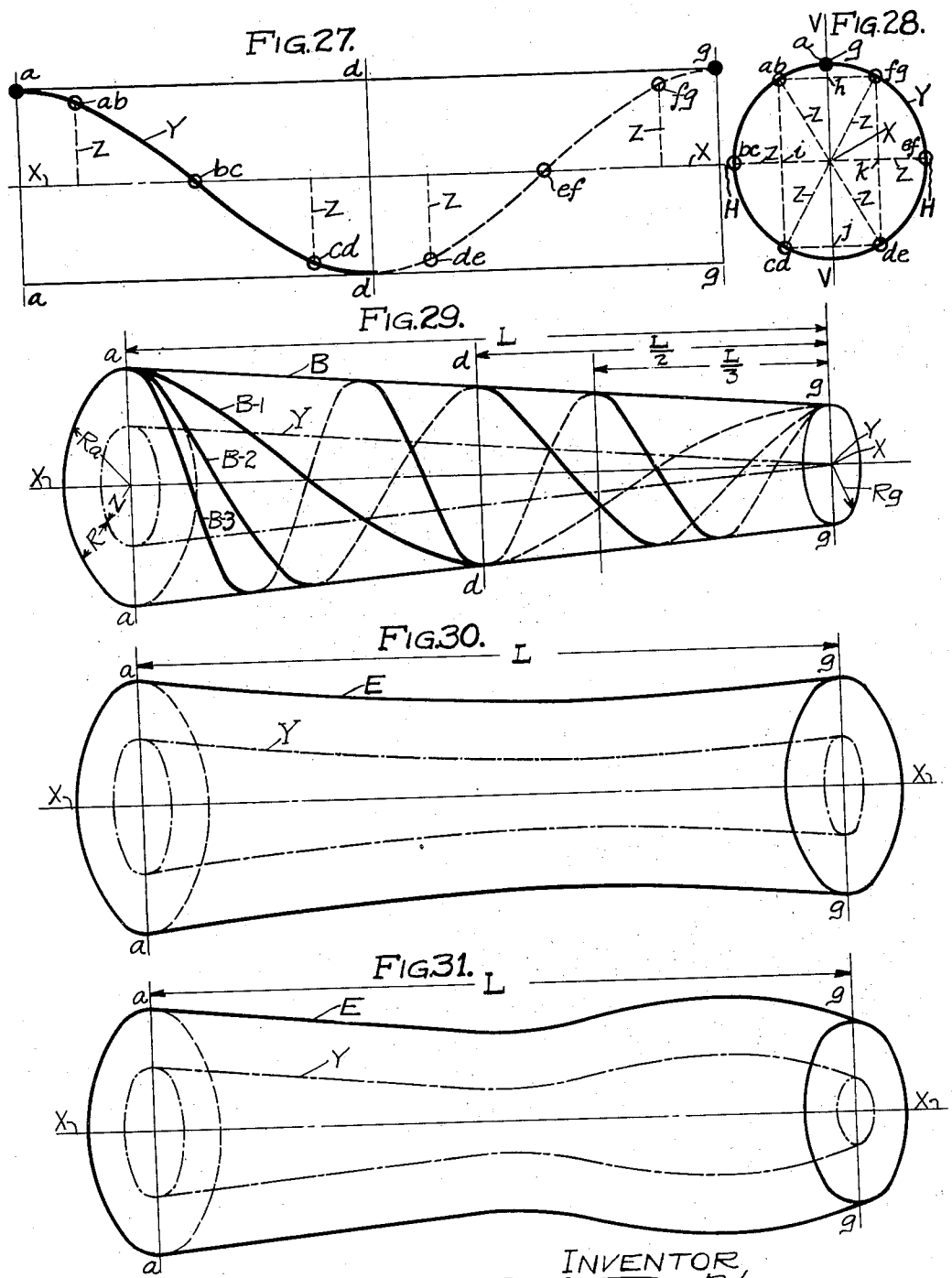
INVENTOR
John B. Wintercorn May 15, 1934. J. B. WINTERCORN 1,958,982
DYNAMIC BALANCING OF TUBULAR SHAFTING FOR TRANSMISSION OF POWER PURPOSES
Filed Sept. 1, 1928 7 Sheets-Sheet 4
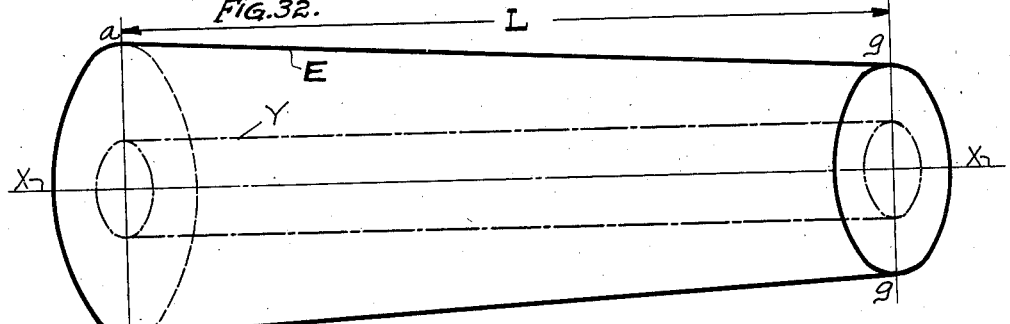
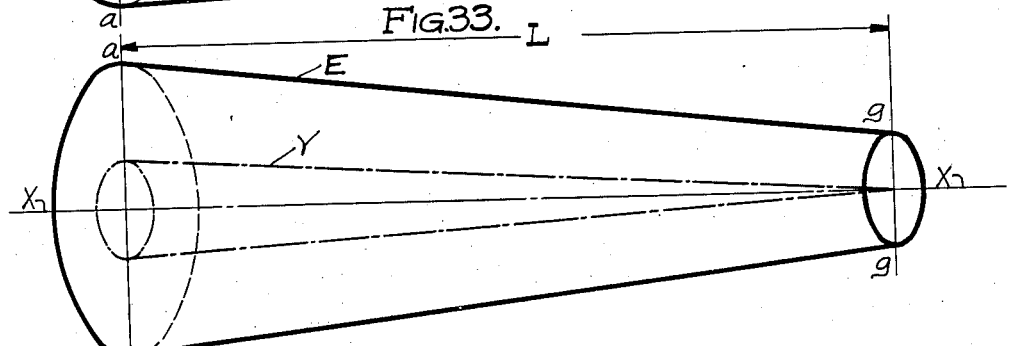
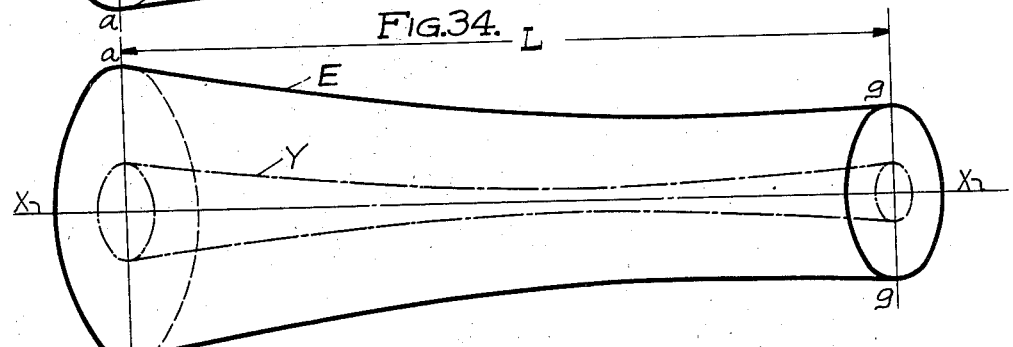
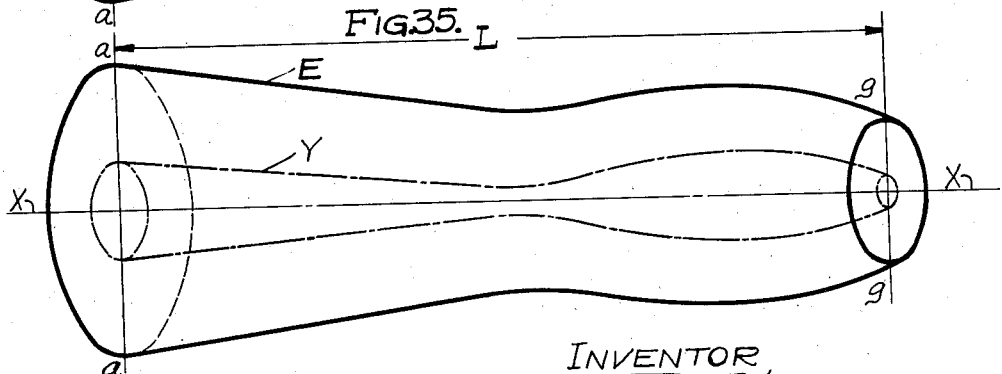
INVENTOR
John B. Wintercorn

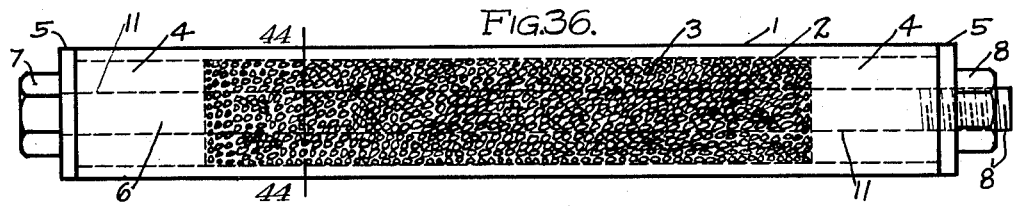
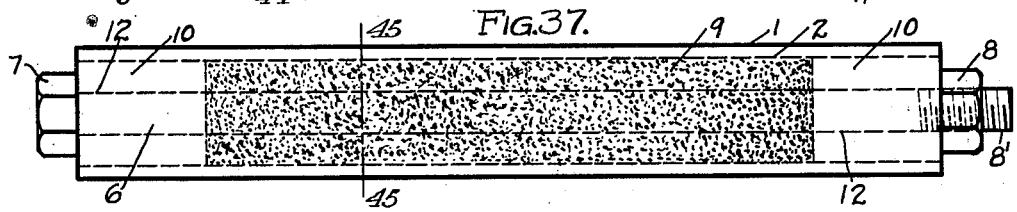
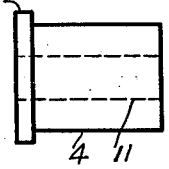 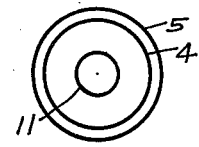 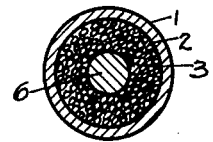 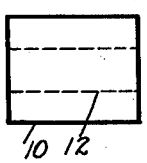 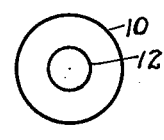
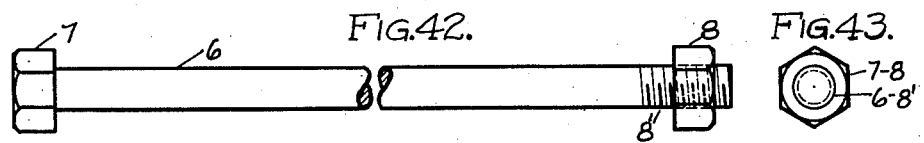 
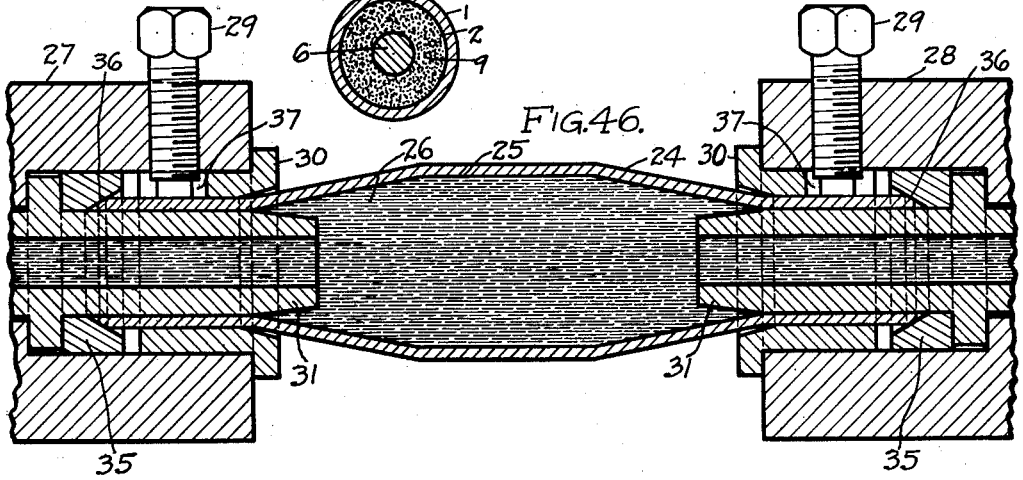

May 15, 1934.  J. B. WINTERCORN  1,958,982
DYNAMIC BALANCING OF TUBULAR SHAFTING FOR TRANSMISSION OF POWER PURPOSES
Filed Sept. 1, 1928  7 Sheets-Sheet 6

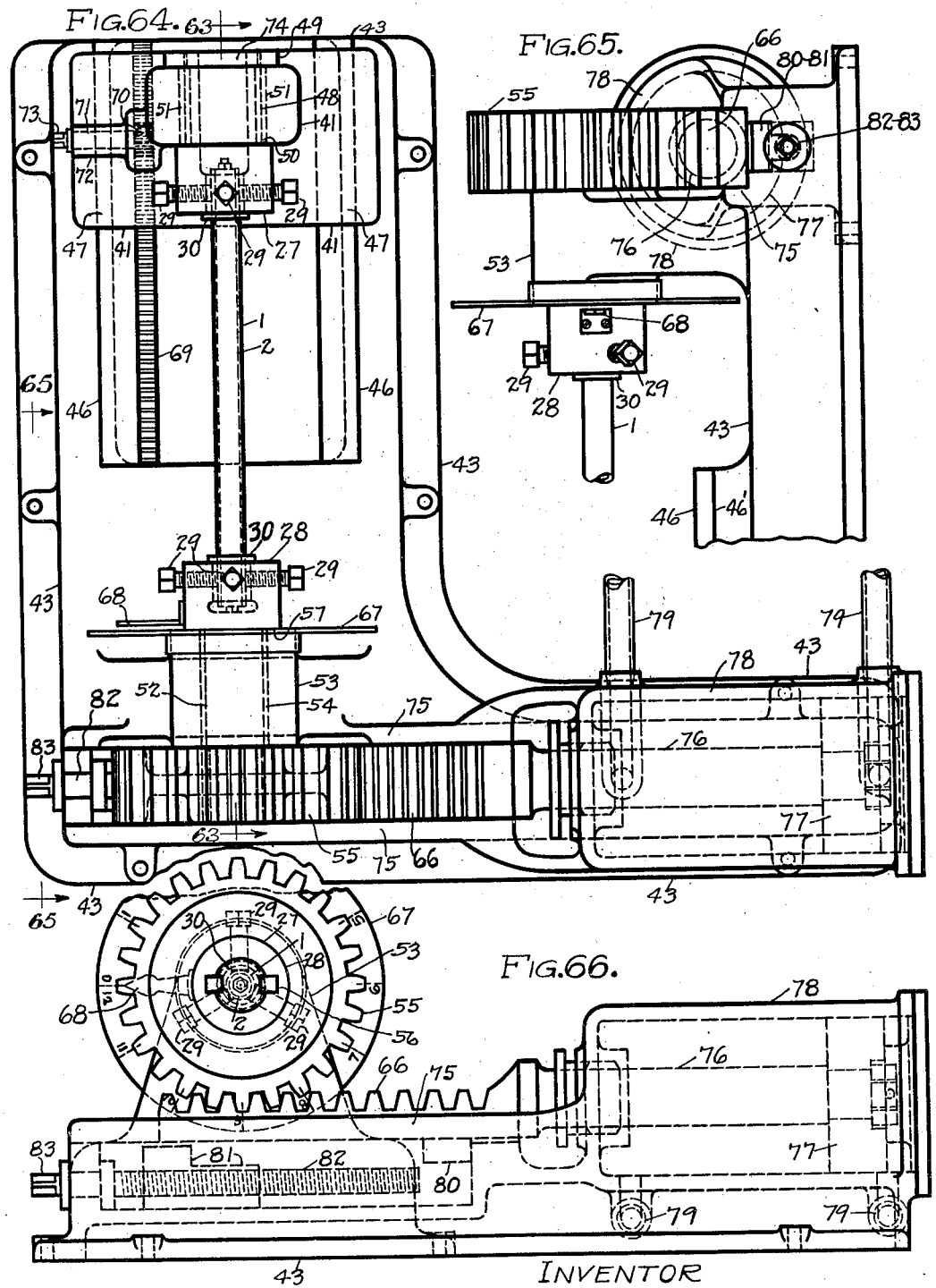

Patented May 15, 1934

1,958,982

UNITED STATES PATENT OFFICE 1,958,982

DYNAMIC BALANCING OF TUBULAR SHAFTING FOR TRANSMISSION OF POWER PURPOSES

John B. Wintercorn, Chicago, Ill.

Application September 1, 1928, Serial No. 303,379

18 Claims. (Cl. 153—78)

This invention relates to a novel means of securing dynamic balance, or so-called running balance, in tubular shafting for transmitting power at all speeds of rotation, but in particular at high speeds of rotation. Likewise, it has reference to all power transmission by means of tubular shafting, but has particular reference to automotive propeller tubular shafting.

The material for making tubular shafts usually consists of steel tubing of cylindrical form and circular cross section. These are cut to length, and if of smaller outside diameters, are applied directly to the universal joint connections, if found to be in sufficient dynamic balance. If not in balance to the degree required for quiet operation, they are usually discarded, as there is no existing satisfactory method for dynamically balancing such shafts. The larger outside diameter tubes require the reduction of their end diameters by swaging, to accommodate the diameter of the universal joint connections, and thus have conical portions at each end thereof of circular section with the cylindrical length between. The steel tubing used is either seamless or has a welded seam, the latter being the least expensive, though less strong than the seamless due to the lack of uniformity in welding of the seam. Welded tubes are generally better than seamless tubes, however, from the standpoint of dynamic balance.

It is to be understood from the description of the method of dynamic balancing of tubular shafts herein, that this method is not intended to be confined to the sole purpose of dynamically balancing steel tubular shafts of circular cross section and cylindrical or conical form, or combination cylindrical and conical form, but is intended to be equally applicable to the forms and cross sections later to be described, and of course made of various metals besides steel, where it should be found advantageous to use such other metals. Since steel is the more commonly used, however, the description herein has been devoted exclusively to steel tubes. Also the form of the tubes dealt with are cylindrical or conical, or a combination of the two forms.

Both seamless and welded seam steel tubing, of cylindrical form and circular cross section, are formed over cylindrical mandrels of circular cross section and of the same diameter as the bore thereof. The mandrels are not held in fixed concentric relation to the outside surfaces of the tubes being formed in either case, due to the fact that there is no possibility of doing so. It is this condition in the manufacture of tubing, known as "floating" of the mandrels, which is directly the cause of the inaccuracy of thickness of the walls of the tubes. The maximum amount of variation from the nominal wall thickness permissible, is usually specified as plus or minus ten per cent of the nominal wall thickness. Thus the wall of the tube may be ten per cent of the nominal wall thickness thicker at one point in the length of the tube, and ten per cent of the nominal wall thickness thinner at the same point but diametrically opposite the thicker part. In seamless tubing, this variation in wall thickness is always impossible of predetermination, and may be found only in short length distances in the tube alternating with perfectly uniform walls, or may be found to exist for the full length of the tube in varying amount, but under ten per cent, and following a longitudinal direction in a straight line, or a curve of helical form about the axis of the outside surface. In welded tubing, the variation in thickness of the walls may be predetermined with much greater exactness, as the variation will usually only be found along the longitudinal seam, and will be fairly uniform in amount for the length of the tube. From this consideration, welded tubing is superior to the seamless, as this is the reason the welded tubing is in better dynamic balance.

The swaging operation on the ends of the tubes has practically no effect on the inaccuracies in thickness of the walls, and such inaccuracies are transmitted to the swaged conical portions at the ends of the automotive propeller tubular shafts without alteration.

For most commercial purposes, the variation in thickness of the walls of tubing from the uniform nominal thickness desired, is not of great importance. But when such tubing is to be used as tubular shafts, then these variations are of vital importance, as they are the cause of dynamic unbalance in tubes. The requirement for perfect balance in tubes is, of course, that the walls be of uniform thickness, which may be expressed also in this manner: If the metal of the walls is embraced by two surfaces whose longitudinal gravity axes coincide, then the moments of the metal of the walls will be in equilibrium about that common longitudinal gravity axis, and the tube will be in dynamic balance about the common longitudinal gravity axis. Where there is variation in thickness of the walls of the tube, there is no coincidence of the gravity axes, namely, the axis of the outside surface and the axis of the bore longitudinally, and so there can be no dynamic balance in such tubes. The effect of variation in thickness of the walls of tubes when rotating as tubular shafts, is to cause excessive vibration, due to the kinetic energy of the unbalanced portion of the tube walls. This kinetic energy is directly proportional to the unbalanced masses, and is proportional to the square of the velocity of the unbalanced masses about the axis of rotation.

Hitherto, this matter of dynamic balance in tubular shafts has been largely ignored from necessity, as there was no remedy for it. Seamless tubes, though stronger than the welded tubes, were used only for the slower speeds of rotation; while the welded tubes were preferred for the higher speeds of rotation, due to the fact that they were better dynamically balanced in manufacture.

With the growing tendency to increased speeds of rotation of automotive propeller tubular shafting, there has been an increasing demand also for greater strength in the tubes for this purpose, and in order to adapt the superior seamless steel tubes to this purpose, the method of dynamic balancing of tubular shafts herein described was invented.

The existing methods of dynamic balancing, which require removal of metal or the addition of metal, are not feasible or convenient on a commercial basis in their application to tubes, due chiefly to the difficulty of reaching into the restricted space of the bore for the considerable lengths of automotive propeller tubular shafts, and maintaining the high degree of accuracy required.

In the method of dynamically balancing of tubular shafts, which is the chief object of this invention, there is no metal removed from the tube nor metal added to the tube in dynamically balancing same, but, as later described in greater detail, the tube is twisted about the axis of the outside surface thereof by means of a special torsion machine, and with the tube bore filled with suitable filling material to support the metal of the walls of the tube to prevent collapse thereof due to the forces set up by the twisting operation. The axis of twist is the axis of the outside surface of the tube, as this is also the axis of rotation of the tubular shaft when in service, and the shaft must run true with respect to its outside surface.

The details of my invention will be made clear by referring to the following drawings:

Fig. 1 is a longitudinal section of a cylindrical tubular shaft with parallel straight axes in the same plane.

Fig. 2 is an end elevation partly in section of Fig. 1.

Fig. 3 is a side elevation of a cylindrical tubular shaft with intersecting straight axes in the same plane.

Fig. 4 is an end elevation of Fig. 3.

Fig. 5 is a side elevation of a cylindrical tubular shaft with non-intersecting straight axes not in the same plane.

Fig. 6 is an end elevation of Fig. 5.

Fig. 7 is a side elevation of a cylindrical tubular shaft with straight axis of the outside surface, and the axis of the bore a space curve, and the axes therefore not in one plane.

Fig. 8 is an end elevation of Fig. 7.

Fig. 9 is a side elevation of a conical tubular shaft with parallel straight axes in the same plane.

Fig. 10 is an end elevation of Fig. 9.

Fig. 11 is a side elevation of a conical tubular shaft with intersecting straight axes in the same plane.

Fig. 12 is an end elevation of Fig. 11.

Fig. 13 is a side elevation of a conical tubular shaft with non-intersecting straight axes not in the same plane.

Fig. 14 is an end elevation of Fig. 13.

Fig. 15 is a side elevation of a conical tubular shaft with straight axis of the outside surface, and the axis of the bore a space curve, and the axes therefore not in one plane.

Fig. 16 is an end elevation of Fig. 15.

Fig. 17 is a side elevation of a solid cylinder of the same outside diameter and length as the cylindrical tubular shaft shown in Fig. 1 and Fig. 2, and twisted through one turn of 360 deg.

Fig. 18 is an end elevation of Fig. 17.

Fig. 19 is a side elevation of a hollow cylinder of the same diameter and length as the bore of the cylindrical tubular shaft shown in Fig. 1 and Fig. 2, and having a line X parallel to the axis Y of the cylinder, and the same distance therefrom as exists between the axes X and Y in Fig. 1 and Fig. 2.

Fig. 20 is an end elevation of Fig. 19.

Fig. 21 is a side elevation of the hollow cylinder of Fig. 19 and Fig. 20, after being twisted through one turn of 360 deg. about the line X as an axis.

Fig. 22 is an end elevation of Fig. 21.

Fig. 23 is a side elevation of the cylindrical tubular shaft shown in Fig. 1 and Fig. 2, but after having been twisted through one turn of 360 deg. of the one end a—a with respect to the end g—g, and about the axis X.

Fig. 24 is an end elevation of Fig. 23.

Fig. 25 shows diagrammatically the disposition of the equal cylindrical surface portions of the hollow cylinder of Fig. 19 and Fig. 20, as concentrated at their respective centers of gravity on the axis Y, and their relation to the axis X, prior to twisting about the axis X.

Fig. 26 is an end elevation of Fig. 25.

Fig. 27 is a side elevation of the regular helix about the axis X, into which the axis Y of Fig. 25 and Fig. 26 is formed when the hollow cylinder of Fig. 19 and Fig. 20 is twisted through one turn of 360 deg. of the end a—a with respect to the end g—g. The equal cylindrical surface portions of the hollow cylinder, as shown in Fig. 25 and Fig. 26, are now shown in their new relation about the axis X and on the helical form of the axis Y.

Fig. 28 is an end elevation of Fig. 27, and showing the moments of the cylindrical surface portions about the axis X.

Fig. 29 shows diagrammatically the helixes which the element B of Fig. 3 and Fig. 4 assumes when the tube is twisted through turns each of 360 deg. of the end a—a with respect to the end g—g. The truncated cone a—a—g—g shows the surface of revolution formed by the element B for an infinite number of twists of the tube, and assumed by the bore for an infinite number of twists of the tube about the axis X. The cone shows the surface of revolution formed by the axis Y for an infinite number of twists of the tube about the axis X.

Fig. 30 is a diagram of the surface of revolution of the bore of the tube in Fig. 5 and Fig. 6, and of the surface of revolution of the axis Y, for an infinite number of twists of the tube about the axis X.

Fig. 31 is a diagram of the surface of revolution of the bore of the tube in Fig. 7 and Fig. 8, and of the surface of revolution of the axis Y, for an infinite number of twists of the tube about the axis X.

Fig. 32 is a diagram of the surface of revolution of the bore of the tube in Fig. 9 and Fig. 10, and of the surface of revolution of the axis Y, for an infinite number of twists of the tube about the axis X.

Fig. 33 is a diagram of the surface of revolution of the bore of the tube in Fig. 11 and Fig. 12, and of the surface of revolution of the axis Y, for an infinite number of twists of the tube about the axis X.

Fig. 34 is a diagram of the surface of revolution of the bore of the tube in Fig. 13 and Fig. 14, and of the surface of revolution of the axis Y, for an infinite number of twists of the tube about the axis X.

Fig. 35 is a diagram of the surface of revolution of the bore of the tube in Fig. 15 and Fig. 16, and of the surface of revolution of the axis Y, for an infinite number of twists of the tube about the axis X.

Fig. 36 is a side elevation of a cylindrical tubular shaft, and provided with means to prevent collapse of the walls of the tube during the twisting operation.

Fig. 37 is a side elevation of a cylindrical tubular shaft, and provided with means to prevent collapse of the walls of the tube during the twisting operation, and differing in some respects from the means shown in Fig. 36.

Fig. 38 is a side elevation of tube flanged end filling plug, as shown in Fig. 36.

Fig. 39 is an end elevation of Fig. 38.

Fig. 40 is a side elevation of tube plain end filling plug, as shown in Fig. 37.

Fig. 41 is an end elevation of Fig. 40.

Fig. 42 is a side elevation of end filling plug tie rod, as shown in Fig. 36 and Fig. 37.

Fig. 43 is an end elevation of Fig. 42.

Fig. 44 is a section at 44—44 in Fig. 36.

Fig. 45 is a section at 45—45 in Fig. 37.

Fig. 46 is a sectional side elevation of a cylindrical tubular shaft having conical portions at each end thereof, and with liquid filling material, and showing the chucks of the torsion machine, with tube gripping screws, centering bushings, mandrels for supporting the ends of the tube and also acting as plugs, liquid seal tapered bore chucking rings, similar to the details shown in Fig. 63, but to a larger scale.

Fig. 47 is a side elevation of a cylindrical tubular shaft, and provided with means to prevent collapse of the walls of the tube during the twisting operation, and differing from the means shown in Fig. 36 and Fig. 37.

Fig. 48 is an end elevation of Fig. 47.

Fig. 49 is a side elevation of a cylindrical tubular shaft, and provided with means for preventing collapse of the walls of the tube during the twisting operation, and differing from the means shown in Fig. 36, Fig. 37, and Fig. 47.

Fig. 50 is an end elevation of Fig. 49.

Fig. 51 is a side elevation of tube plain end filling plug, as shown in Fig. 47.

Fig. 52 is an end elevation of Fig. 51.

Fig. 53 is a side elevation of tube short filling plug, as shown in Fig. 47.

Fig. 54 is an end elevation of Fig. 53.

Fig. 55 is a side elevation of tube short split filling plug, as shown in Fig. 49.

Fig. 56 is an end elevation of Fig. 55.

Fig. 57 is a side elevation of tube end split filling plug key, as shown in Fig. 49.

Fig. 58 is an end elevation of Fig. 57.

Fig. 59 is a side elevation of tube end split filling plug, as shown in Fig. 49.

Fig. 60 is an end elevation of Fig. 59.

Fig. 61 is a side elevation of split filling plug core rod, as shown in Fig. 49.

Fig. 62 is an end elevation of Fig. 61.

Fig. 63 is a vertical fragmentary sectional side elevation at 63—63 of Fig. 64, but showing liquid filling material for the cylindrical tubular shaft to be twisted, and air or hydraulic operation of the stationary chuck head, instead of the manually operated rack and pinion mechanism shown in Fig. 64.

Fig. 64 is a plan view of a torsion machine for twisting tubular shafts, and with the tubes provided with means for preventing collapse of the walls of the tube during the twisting operation as shown in Fig. 36, Fig. 37, Fig. 47, Fig. 48, Fig. 49, Fig. 50.

Fig. 65 is a fragmentary side elevation of the torsion machine at 65—65 of Fig. 64, showing the torsion head, chuck, gripping screws, dial and indicator, drive gear, rack, and rack piston rod, piston, and cylinder.

Fig. 66 is an end elevation of the torsion machine shown in Fig. 64.

In order to show the underlying geometrical and mechanics' basis of the twisting method of securing dynamic balance in tubular shafts, the following demonstrations are given. These show the theoretical limitations of the method, while pointing out the attainable results, and the fact that cylindrical circular section tubes and conical circular section tubes may be given the degree of practical dynamic balance needed to render them suitable for automotive propeller tubular shafts. Also there is given the whole range of tubes, of various cross sectional form, cylindrical or other form, which can be dynamically balanced by the method.

The four classes of divergency from coincidence of the two axes of commercial tubes, namely, the axis of the outside surface of the tube, and the axis of the bore of the tube, will apply to the full length cylindrical tube, the full length conical tube, and the combination cylindrical and conical tube, and are as follows:

Class (1).—Parallel straight axes in the same plane.

Class (2).—Intersecting straight axes in the same plane.

Class (3).—Non-intersecting straight axes not in the same plane.

Class (4).—Straight axis of the outside surface, but the axis of the bore being a space curve, and hence not in a plane.

The phrase "in the same plane", is used only to emphasize the difference between the classes of divergency. From geometry, the axes in Classes (1) and (2), must be in the same plane. Also, in Class (3), the axes cannot be in the same plane. In Class (4), a space curve, rather than a plane curve, was chosen as more general.

The demonstrations will be concerned with circular section cylindrical and conical tubes only, and combinations of these being only special cases, are not included. These are the usual forms in practice. But it will be apparent from the demonstrations, tubes of any symmetrical outside surface section can be treated in the same manner, and will be dynamically balanced by twisting about the axis of the outside surface, the term "symmetrical" having a geometrical meaning, and signifying that the axis bisects all straight lines at right angles to the axis and passing through the outside surface of the tube and the axis thereof. The axis of the outside surface will in every instance become the gravity axis of the surface of the bore, as it is of the surface of the outside of the tube, and consequently the metal in the walls of the tube has the moments about the axis in equilibrium, and therefore the tube itself is in dynamic balance about the axis of the outside surface of the tube.

It should be noted that, where it is important to maintain the outside surface of the tube in the same form after twisting as before twisting the tube, it should be understood that the tubes whose outside surfaces are of circular cross section are the only ones that will not be distorted by the twisting operations. For other than circular cross sections, the outside surface of the tube will be distorted into helical form, though the individual sections taken at right angles to the longitudinal axis will be the same after twisting as before twisting, due to the filling material in the bore.

In general, any tube having the following characteristics can be dynamically balanced about the axis of the outside surface by means of the method of twisting described herein:

Tubes having their outside surface sections symmetrical with the axis at all points, so that the axis is also the gravity axis of the outside surface, and passes through the center of gravity of each section at all points along the axis, is apparent from the definition of "symmetrical" as given above. The sections may be: any equilateral polygon; any parallelogram; any ellipse; any circle; any other figure of any form symmetrical with the axis. The size, the kind, of section may vary in any manner along the axis.

The bore of the tubes may be symmetrical, or may be unsymmetrical, about the axis of the bore. The bore may have the same sectional form as the outside surface of the tube, or not. It may extend for the full length of the tube, or not.

By theoretical as well as experimental evidence it is known that static balance in a tube does not necessarily indicate dynamic balance also therein. The balancing operation on the tube may secure static balance, but may cause such a distribution of the metal in the walls of the tube that, when the tube is rotated about the longitudinal axis of the outside surface thereof, there may be caused to be present a resultant unbalancing couple composed of two resultant centrifugal forces acting in opposite directions to each other on opposite sides of the tube at two separated points in the length of the tube which tend to rotate the tube about an axis at right angles to the longitudinal axis of rotation mentioned, thus causing dynamic unbalance and consequent vibration in the tube. Further, it is known that a tube in dynamic balance will also be in static balance, but not vice versa, as pointed out above, except accidentally so.

Therefore, the twisting method of dynamically balancing tubes described herein makes provision for twisting each tube individually an unpredetermined number of turns and parts of a turn until satisfactory dynamic balance is shown by test in each individual tube, without reference to static balance.

It may be demonstrated, by methods in conformity with the principles applied to the tubes shown in the drawings, that tubes having the following characteristics can be dynamically balanced by twisting through one turn of 360 deg. of the one end of the tube with respect to the end opposite, about the axis of the outside surface of the tube: tubes with the outside surface symmetrical with the axis of the outside surface, for the full length, as defined before, and having a bore of any section as given for the outside surface, and symmetrical about its axis for the length of the outside surface, or for a length of bore less than the length of the outside surface, but of uniform section in form and dimensions, and with the axes of the outside surface and of the bore in divergency Class (1).

Tubes having characteristics differing from those given above, but in conformity with the requirements otherwise, as given previously for the general classification of tubes which may be dynamically balanced by twisting, will require an infinite number of twists through an infinite number of turns, each of 360 deg., of the one end with respect to the end opposite, and about the axis of the outside surface.

Obviously no tube of any material used in commercial tubes, can be twisted an infinite number of turns, each of 360 deg., without rupture, and therefore perfect dynamic balance is not attainable for all forms of tubes by this method. But it can be stated, all tubes of the above description will be nearer to perfect dynamic balance with each succeeding twist through a turn of 360 deg., to which they have been subjected. Also, for ordinary commercial cylindrical and conical tubing, the method will secure the degree of dynamic balance required for commercial tubular shafting, and without an excessive number of twists of the tube, which would rupture the tube or impair its strength.

Referring to the drawing, Fig. 1 to Fig. 8 inclusive, show cylindrical tubes, and made by the methods of manufacture described. Fig. 9 to Fig. 16 inclusive, show conical tubes made as described before by swaging cylindrical tubes, or by forming steel plate over a conical mandrel and welding the seam. For both kinds, cylindrical and conical, the outer surfaces are symmetrical with the axis of the outside surface. The divergency between the axis of the outside surface and the axis of the bore, is purposely exaggerated to more clearly illustrate each class.

In the demonstrations, except for that of the circular section cylindrical tube in Class (1), the surface of the bore of the tube will be shown to assume the form of a surface of revolution about the axis of the outside surface of the tube, after the tube has been twisted through an infinite number of turns, each of 360 deg., of the one end of the tube with respect to the end opposite, and about the axis of the outside surface.

Referring to Fig. 1 to Fig. 8 inclusive, and Fig. 9 to Fig. 16 inclusive, the outside surface of the tube is 1 and the axis thereof is X, the surface of the bore is 2 and the axis thereof is Y.

The surface of revolution, which the surface of the bore of the tube assumes when the tube is twisted an infinite number of turns, each of 360 deg., about the axis X of the outside surface of the tube, is the maximum surface of revolution which the surface of the bore may assume. This maximum surface of revolution is produced by rotating an element E in its surface about the axis X, and, of course, the element E will lie in the plane of the drawing. The element E is produced by projecting an element B, which lies in the surface 2 of the bore but is not a true element geometrically of the surface 2, into the plane of the drawing. The definition of the element B is as follows:

If, at an infinite number of points along the axis X, and for the full length thereof, perpendicular lines be projected to pierce the surface 2 of the bore of the tube, so that, in each case, the piercing line is the maximum which may be projected from the axis X, from that point in the axis X to the surface 2, then an element B will be described by the piercing lines in the surface 2, which will be a space curve in some instances, and a straight line in others, depending upon the form of the axis Y, and the divergency class relationship between the axis X and the axis Y. The element B will be continuous, or non-continuous, for the length of the tube, depending upon the following conditions: If the Y axis does not intersect the axis X at any point in the length of the tube, then the element B will be unbroken, or continuous. If, however, the axis Y intersects the axis X at one or more points in the length of the tube, then the element B will be broken, or be non-continuous, and will consist of portions equal in length to the lengths intercepted by the axis Y on the axis X, and the sum of the portions of the element B will project into a length equal to the length of the tube, and equal to that of the projected continuous element B, as will be clear from the definition of the element E, to follow.

If the axis X be considered rotated in the plane of the drawings, the piercing lines, with element B at the end away from the axis X, will pass through the plane of the drawing, so that the element B will project into an element E, which lies in the plane of the drawings. This element E is a true geometric element in the surface of the maximum surface of revolution, and would produce the maximum surface of revolution, identical with that which would be produced by rotating the element B about the axis X, and is the maximum surface of revolution which is produced by the surface 2 of the bore of the tube, after the tube has been twisted through an infinite number of turns, each of 360 deg., about the axis X.

For the cylindrical tube in Class (1) of divergency between the two axes X and Y, the demonstration will consist in showing the disposition of the surface 2 of the bore about the axis X of the outside surface, after the tube has been twisted through one turn of 360 deg., of the one end of the tube with respect to the end opposite, and showing that the equal portions of the surface of the bore, when the surface 2 of the bore is considered as a hollow cylinder of the same dimensions and form as the bore, and twisted through one turn of 360 deg., will have the moments of the surfaces of the equal portions in equilibrium about the axis X, and thus showing that axis X has become the gravity axis of the surface 2 of the bore, after the tube has been twisted through one turn of 360 deg., about the axis X. Also, that the metal in the walls of the tube, being embraced between two surfaces 1 and 2, whose gravity axes are now coincident with the axis X, must have all moments in equilibrium about the axis X, and therefore the tube will be in dynamic balance about the axis X, after being twisted through one turn of 360 deg., of the one end of the tube with respect to the end opposite, and about the axis X.

Fig. 1 and Fig. 2 show a circular cylindrical tubular shaft, and illustrate divergency Class (1). The outside surface of the tube is 1, and the axis thereof is X. The surface of the bore is 2, and the axis thereof is Y. The two diametrically opposite, longitudinal segmental strips S and W, have equal, uniform, angular width, the same length, but have different radial thicknesses, as is clearly shown. Thus the moments of the strips S and W, about the axis X, will be unequal, and hence the strips are in dynamic unbalance about the axis X. There is only one pair of such strips, as the above, which will be in dynamic balance, prior to the twisting operation, and this pair is on a diameter, at right angles to the pair S and W, through the axis X. Thus, since the balance of the tube demands that all the pairs of strips must be in dynamic balance about the axis X, before the tube as a whole will be in dynamic balance about that axis, it is evident that the tube is in dynamic unbalance prior to being twisted about the axis X. The axes X and Y are parallel as shown, and separated by a distance Z. A longitudinal element in the outside surface 1 of the tube is shown as O. In this case the element B, as defined before coincides with the projected element E, and so the element B itself is shown. The elements O and B are parallel to each other, and diametrically on the same line and in the same plane. The tube has been divided into a number of cylindrical portions of equal length, and hence are equal in all respects, as a—a—b—b, b—b—c—c, c—c—d—d, d—d—e—e, e—e—f—f, f—f—g—g, for the purposes later made clear.

Referring to Fig. 17 and Fig. 18, these show a solid cylinder of the same outside diameter and length as the tube in Fig. 1 and Fig. 2. The outside cylindrical surface is 1, and the axis is X. This cylinder will be in dynamic balance about the axis X, as the surface 1 is symmetrical with the axis X at all points along the axis X, and the axis X is the gravity axis of the surface 1, and the metal volume embraced by the surface 1, must be in dynamic balance about the axis X, as the moments about the axis X, both before and after the twisting operation, are in equilibrium. The element O, formerly a straight line, has become a regular helix about the axis X. This is the form of all other elements which compose the entire surface 1 of the cylinder, after having been twisted through one turn of 360 deg., of the end a—a with respect to the end g—g, and about the axis X. This cylinder, after twisting, corresponds to the tube in Fig. 1 and Fig. 2, after twisting likewise, but with suitable filling material in the bore thereof, to prevent collapse of the walls of the tube, which preserves the form of the outside surface of the tube in its original form though the fibers of the metal be in helical form about the axis X. Thus in the case of the cylinder, the metal in the interior thereof supports the metal in the outer portions from the axis X and prevents change in the form of the outer surface thereof.

Fig. 19 and Fig. 20 show a hollow cylinder of a diameter and length equal to that of the surface 2 of the bore in Fig. 1 and Fig. 2. The cylindrical surface is 2, and the axis thereof is Y, and is distant by an amount Z from the line X, which corresponds to the axis X of the tube. The element B is identical with the element B in Fig. 1 and Fig. 2. The cylinder has been divided into identical equal portions in length and diameter as shown in Fig. 1 and Fig. 2, and are: a—a—b—b, b—b—c—c, c—c—d—d, d—d—e—e, e—e—f—f, f—f—g—g; and may be designated: ab, bc, cd, de, ef, fg. The cylindrical surfaces of each of these portions ab, $bc$, $cd$, etc., may be considered as concentrated at their respective centers of gravity, which in each case lies on the axis Y. Thus each of the centers of gravity will lie on the axis Y, and the space between adjacent centers of gravity will be equal, as shown in Fig. 25 and Fig. 26 in diagrammatic form. The distance Z between the axis Y and the line X, is exaggerated for greater clarity, the lines Z being at right angles to the axis Y and line X, and are the moment arms of the surfaces $ab$, $bc$, $cd$, etc., about the line X. It is evident that the hollow cylinder in Fig. 19 and Fig. 20 is not in balance about the line X from inspection of Fig. 25 and Fig. 26, since all moments of the surfaces $ab$, $bc$, $cd$, etc., are on one side of the line X, and hence are not in equilibrium about the line X, and therefore the axis X of the tube in Fig. 1 and Fig. 2 is not the gravity axis of the surface 2 of the bore prior to the twisting operation.

Fig. 21 and Fig. 22 show the hollow cylinder of Fig. 19 and Fig. 20, after being twisted through one turn of 360 deg., of the end $a$—$a$ with respect to the end $g$—$g$, and about the line X as an axis. The element B has become a regular helix about the axis X. The axis Y has assumed the form of a regular helix also about the axis X. Thus, since the end elevation of a regular helix is a circle, the axis Y appears as a circle in Fig. 22 with a radius equal to Z. This radius Z is equal to the moment arm Z in Fig. 19, Fig. 20, Fig. 25, Fig. 26.

Fig. 23 and Fig. 24 show the tubular shaft of Fig. 1 and Fig. 2, after the tube has been twisted through one turn of 360 deg., of the end $a$—$a$ with respect to the end $g$—$g$, and about the axis X. All numerals and letters have the same significance as in Fig. 1 and Fig. 2. The element O has assumed the form of a regular helix about the axis X, as is the case with all other elements of the outside surface 1 of the tube. The elements composing the surface 2 of the bore, in this case, are likewise regular helices about the axis X, a regular helix being defined as a space curve of constant radius about a straight line axis, and having a constant pitch.

It is apparent, that if the solid cylinder of Fig. 17 and Fig. 18 be twisted through one turn of 360 deg., of the end $a$—$a$ with respect to the end $g$—$g$, and about the axis X, and a bore be formed therein, so that its surface would be identical with the twisted hollow cylinder of Fig. 21 and Fig. 22, and with the ends of the elements O and B in the same relation as in Fig. 1 and Fig. 2, and the axes X, respectively of the cylinder of Fig. 17 and Fig. 18, and of Fig. 21 and Fig. 22, coincide, then a twisted tube such as shown in Fig. 23 and Fig. 24 will result, and be identical in every respect therewith.

Referring to Fig. 25 and Fig. 26, which were previously described, and to Fig. 27 and Fig. 28, which latter figures show the regular helix formed by the axis Y about the axis X, to a larger scale than in Fig. 21 and Fig. 22, and in diagrammatic form, it is seen that the surfaces of the equal cylindrical portions $ab$, $bc$, $cd$, etc., are now distributed about the axis X in such a manner, that they are in balance about the axis. The moment arms Z, as described before, are equal, and in Figure 28 are seen to terminate in the circle formed by the axis Y. This circle, with X as the center, is the end elevation of the regular helix formed by the axis Y about the line X as an axis in Fig. 27. Applying the principles of mechanics, the moment arms Z, with the surfaces $ab$, $bc$, $cd$, etc., comprise moments about the axis X. The two axes V—V and H—H, are vertical and horizontal axes respectively, with their intersection at the axis X in Fig. 28, and are perpendicular to each other. H—H coincides with a horizontal line through $bc$—X—$ef$. The vertical components on each side of V—V must balance about X, and the horizontal components on each side of H—H must balance about X, for equilibrium. Thus, for the vertical components, $fg-k+de-k=ab-i+cd-i$, on each side of V—V (the components of $bc$ and $ef$ being equal to zero). For the horizontal components, $Z+ab-h+cd-j=Z+fg-h+de-j$, on each side of H—H. The components of the moments about the axis X, are therefore seen to be in equilibrium about the axis X, and the surfaces $ab$, $bc$, $cd$, etc., are in balance about that axis. Consequently, the twisted hollow cylinder of Fig. 21 and Fig. 22 will be in balance about the axis X. The axis X therefore, will be the gravity axis of the twisted hollow cylinder of Fig. 21 and Fig. 22, which represents the surface 2 of the bore of the tube in Fig. 1 and Fig. 2 after being twisted through one turn of 360 deg., of the end $a$—$a$ with respect to the end $g$—$g$, and about the axis X.

After the twisting operation, the axis X was seen to be the gravity axis of the surface 1 of the cylinder in Fig. 17 and Fig. 18. Also, the axis X was the gravity axis of the surface 2 of the hollow cylinder of Fig. 19 and Fig. 20, and after being twisted as seen in Fig. 21 and Fig. 22. As the surfaces 1 and 2 correspond to the surfaces of the walls of the tube in Fig. 23 and Fig. 24, it follows that the surfaces 1 and 2 of this tube will have the axis X as the common gravity axis, and therefore, the metal in the walls of the tube will have the axis X as a gravity axis, and the moments of the metal in the walls of the tube must be in equilibrium about the axis X, and the tube will be in dynamic balance about the axis X, after having been twisted through one turn of 360 deg., of the end $a$—$a$ with respect to the end $g$—$g$, and about the axis X, as shown. Since the tube of Fig. 23 and Fig. 24 is identical with that shown in Fig. 1 and Fig. 2, but after the tube of Fig. 1 and Fig. 2 has been twisted, it may be stated that a tube such as shown in Fig. 1 and Fig. 2, in Class (1) of divergency of the two axes, can be dynamically balanced by twisting the tube about the axis of the outside surface, through one turn of 360 deg., of the one end thereof with respect to the end opposite, and about the axis of the outside surface of the tube.

The foregoing demonstration for tubes in Class (1) is actually one for static balance and not for dynamic balance, since a regular helix will only be in static balance about the axis X and not in dynamic balance. But, where there is little or no difference in the mass of each of the helical strips in the walls of the tube, it is apparent that these helical strips will practically dynamically balance each other, and the tube as a whole will be in dynamic balance when it is in static balance. Thus this demonstration is applicable only to small outside diameter thin walled tubes, such as are employed for automotive tubular propeller shafts. For large diameter thick walled tubes, the demonstration is not applicable, and such tubes will usually require more than one full turn to secure practical dynamic balance therein, and the demonstrations for tubes in Classes (2), (3), (4), will apply to these tubes of Class (1). It is known that, as the tubes are twisted and approach static balance they also approach dynamic balance, but not to the same extent, except in the case of the small outside diameter thin walled tubes mentioned where static balance and dynamic balance are practically coincident.

Referring to Fig. 3 and Fig. 4, the numerals and letters have the same significance as in Fig. 1 and Fig. 2, with the exceptions to be noted. The tube shown illustrates divergency Class (2), and the axes X and Y intersect at g—g, and are separated a distance Z at a—a. This tube is in dynamic unbalance prior to twisting, as may be shown in the same manner as for the tube in Fig. 1 and Fig. 2. The demonstration for this tube is made in conjunction with Fig. 29. In Fig. 29, the element B is a straight line prior to twisting the tube, between a—a and g—g, the same as in Fig. 3 and Fig. 4. As in Fig. 1 and Fig. 2, the element B in the surface 2 of the bore of the tube, coincides with the projected element E, and therefore the element B itself is shown. If now the tube be twisted about the axis X through one turn of 360 deg., of the end a—a with respect to the end g—g, then element B assumes the form of an irregular helix B—1 (see Fig. 29), about the axis X, with a pitch equal to L, the length of the tube, an irregular helix being a space curve of variable radius about a straight line axis. For two twists about the axis X, through two turns, each of 360 deg., of the end a—a with respect to the end g—g, the element B assumes the form of an irregular helix B—2 about the axis X, with a pitch equal to L/2, or half the length of the tube. Thus there are two equal pitches L/2 for the length L of the tube. For three twists about the axis X through three turns, each of 360 deg., of the end a—a with respect to the end g—g, the element B assumes the form of an irregular helix B—3 about the axis X, with a pitch L/3, or one third the length of the tube. Thus there are three equal pitches L/3 for the length L of the tube. For an infinite number of twists of the tube about the axis X, through an infinite number of turns, each of 360 deg., of the end a—a with respect to the end g—g, the element B assumes the form of an infinite number of circles about the axis X as the center for each circle, the circles being of variable diameters along the length of the tube. From the fact that the pitch of the irregular helices was decreased for each twist of the tube, it is evident that at the limit, or infinity, the pitch would become zero, as the value of the pitch L/Infinity, is equal to a small quantity divided by an infinitely large quantity, which is equal to zero. Also since a helix with zero pitch is a circle about the axis, the element B, for an infinite number of twists, will become an infinite number of circles along the axis X for the length of the tube. This latter is apparent from consideration of the fact that there are an infinite number of pitches L/Infinity contained in the length L of the tube. Thus for an infinite number of twists of the tube, through an infinite number of turns, each of 360 deg., of the end a—a with respect to the end g—g, the element B will assume the form of an infinite number of circles, of variable diameters, along the length of the axis X and for the length of the tube, which constitutes a surface of revolution about the axis X, with the same length as the length of the tube, and for this tube will be the truncated cone a—a—g—g shown. The axis Y, which is twisted simultaneously with the element B, will be formed into irregular helices about the axis X similarly, and will have the same pitch as the helices of B, and therefore for an infinite number of twists, similarly as for B, the axis Y is formed into an infinite number of circles about the axis X as a center for each circle, and thus a surface of revolution about the axis X is formed by the axis Y, similarly as with the element B. For the axis Y, the surface of revolution is in the form of a cone, of radius Z at its base at a—a, and with its apex at g—g. Therefore, the truncated cone a—a—g—g, will have a radius equal to Z plus the radius R of the bore of the tube, or Ra, at the large end a—a, and a radius equal to the radius R of the bore of the tube, or Rg, at the small end g—g. From the method with which the element B was selected, and as fully described previously, the surface of revolution a—a—g—g is the maximum surface of revolution which the bore would assume for an infinite number of twists through an infinite number of turns, each of 360 deg., of the end a—a with respect to the end g—g of the tube, and about the axis X. It is apparent that the surface of revolution a—a—g—g is symmetrical about the axis X, and therefore the axis X is the gravity axis of the surface of revolution, which is identical with surface 2 of the tube bore. Since the surface 1 of the tube is symmetrical, both before and after twisting, about the axis X, as seen with the tube in Fig. 1 and Fig. 2, the axis X is the gravity axis of surface 1 of the tube. Therefore, surfaces 1 and 2 of the tube have the axis X as the common gravity axis of the two surfaces. The metal of the walls of the tube, embraced between the surfaces 1 and 2, must then have the axis X as a gravity axis, and therefore the moments of the metal of the walls of the tube must be in equilibrium about the axis X, and the tube must be in dynamic balance about the axis X. In contrast with the tube in Fig. 1 and Fig. 2, the tube in Fig. 3 and Fig. 4 will be in theoretically perfect dynamic balance about the axis X of the outside surface of the tube. But in the case of the latter tube, the number of twists needed is infinite in number, and obviously is impossible in practice. But the requirements of practical dynamic balancing, with commercial tubes, does not require the excessive number of twists indicated theoretically. From the foregoing, and referring to Fig. 29, it is seen that the tube approaches perfect dynamic balance as a limit, with each succeeding twist through 360 deg.; and it is plain that each half of a helix, equal to a half pitch, does not balance the other half, but that as the length of the pitch diminishes, the amount of this inequality becomes less and less, and for an infinite number of pitches in the length of the tube, the amount of inequality between halves of the helices, becomes zero, which indicates perfect balance between the two halves. Thus for the infinite number of such helices the same is true. And, for practical commercial dynamic balancing, a few twists, will, ordinarily, secure the balance in the tubes necessary for use as tubular shafts. Fractional parts of a full turn of 360 deg., as mentioned previously, should enable the operator to gauge the desired amount of twisting beyond a number of full turns of 360 deg., for greater refinement in balancing tubes, as it is apparent, from consideration of the surfaces of revolution of the surface of the bore, that the helices, irregular as they are, will permit of commercial dynamic balancing with fractional parts of a turn in many instances, in addition to full turns.

As all other tubes of the remaining classes of divergency for the circular cylindrical tubes, and for all the classes of divergency in the case of the conical tubes, have identical demonstrations with that given for the tube in Fig. 3 and Fig. 4, it is unnecessary to repeat the demonstration, and only a brief statement will therefore be given for the other tubes.

Fig. 5 and Fig. 6 illustrate divergency Class (3) for a cylindrical tube. Fig. 30 shows diagrammatically the maximum surface of revolution, produced by the projected element E, and representative of the surface of the bore for an infinite number of twists of the tube about the axis X. Likewise, a surface of revolution about the axis X for the axis Y is shown. The tube will be dynamically balanced, similarly, as indicated in the demonstration for the tube in Fig. 3 and Fig. 4.

Fig. 7 and Fig. 8 illustrate divergency Class (4) for a cylindrical tube. Fig. 31 shows diagrammatically the maximum surface of revolution of the bore, and the surface of revolution of the axis Y, both about the axis X. The tube will be dynamically balanced similarly as the other tubes described.

Fig. 9 and Fig. 10 illustrate divergency Class (1) for a conical tube. Fig. 32 shows diagramatically the maximum surface of revolution of the bore, and the surface of revolution of the axis Y, both about the axis X. The tube will be dynamically balanced similarly as the other tubes described.

Fig. 11 and Fig. 12 illustrate divergency Class (2) for a conical tube. Fig. 33 shows diagrammatically the maximum surface of revolution of the bore, and the surface of revolution of the axis Y, both about the axis X. The tube will be dynamically balanced similarly as the other tubes described.

Fig. 13 and Fig. 14 illustrate divergency Class (3) for a conical tube. Fig. 34 shows diagrammatically the maximum surface of revolution of the bore, and the surface of revolution of the axis Y, both about the axis X. The tube will be dynamically balanced similarly as the other tubes described.

Fig. 15 and Fig. 16 illustrate divergency Class (4) for a conical tube. Fig. 35 shows diagrammatically the maximum surface of revolution of the bore, and the surface of revolution of the axis Y, both about the axis X. The tube will be dynamically balanced similarly as the other tubes described.

Twisting a tube produces a combination of tension, shearing, and compression stresses in the metal of the walls, and the action of these stresses tends to distort the metal of the walls and to compress it toward the bore of the tube. This action will be readily apparent, when it is remembered that the geometrical elements of the tube walls, in both the bore and on the outside surface of the tube, were changed from straight longitudinal lines to helices about the longitudinal axis of the outside surface of the tube. The fibers of the metal of the walls, which are similarly disposed as the geometrical elements of the walls, also assume the form of helices during the twisting operation, and therefore are stretched and are under tension, and are moved relatively to each other and thus produce a shearing action on one another, and likewise press heavily against one another and thus produce a compression action.

In order to prevent distortion of the outside surface of the tube during the twisting operation, it is necessary to support the walls of the tube against the forces above described. With the bore of the tube filled with non-compressible material, the tension and shearing stresses cannot cause any distortion in the walls, as these two stresses act only toward closing up the bore, and the filling material will effectively prevent this. With the compression stress, however, there is an action normal to the helical fibers in the twisted tube walls, which will cause buckling of the walls in spite of the filling material in the bore, in case the number of turns of twist is very great and where the metal is too hard to allow of compressing within itself. Since the steel used in ordinary automotive propeller shafts is fairly soft, and the number of turns of twisting will never be very great, buckling of the walls will not ordinarily occur, even though the compressing effect will be present. Aside from the bad effect causing buckling, the effect of compression of the steel should be highly beneficial rather than harmful, being similar in its effect as that secured by hammering or rolling.

The metal in the walls of the tube should never, under any circumstance, be subjected to greater stress during the twisting operation than sufficient to pass the elastic limit thereof, so that, when the tube has been twisted sufficiently to secure dynamic balance, it will maintain its balanced condition thereafter when in service as a tubular shaft. The tube may be twisted while heated, or while cold (room temperature), depending upon the particular metal in the tube. In some cases, in order to prevent buckling of the walls due to compression stresses, it may be best to anneal the tube prior to twisting it, and to heat treat it after the twisting operation. These latter matters must be determined by experience with the various metals in the different tubes, and are not relevant to the method of dynamic balancing of tubular shafts which is the subject of this invention.

As the tubes are to be twisted while heated in some instances, and while cold in others, the filling material must be suitable for the temperature to which it will be subjected. Also, since the bore of the tube will undergo considerable alteration, in the disposition of the axis of the bore about the axis of the outside surface, and also from being cylindrical becomes helical, after being twisted, the filling material must be of such a character as to permit ready removal of same from the tube bore after the twisting operation, and before testing for balance of the tube. Likewise, the filling material must be of such a nature as to offer little, or no resistance, to the twisting force exerted by the torsion machine in twisting the tube, as otherwise much useless work is expended in twisting the filling material, which would entail providing a larger, more powerful, and more costly machine, than would otherwise be required. Also it might cause destruction of the filling material in some cases, and thus render the material unfit for further use for this purpose.

The filling material may be put in the bore of the tube prior to placing the tube in the chucks of the torsion machine, or the torsion machine may have proper provision for filling the tube bore, and also supporting the bore at the ends of the tube to prevent collapse of the tube walls at these points due to the pressure exerted by the screws, or jaws, of the chucks.

With some kinds of filling material, such as lead, type metal, babbitt, or other metal melting at about the same temperature as these, and with suitable provision for retaining this filling material in the bore of the tube, after same has been poured into the bore in a molten state and then allowed to cool, it would be possible to make the test for dynamic balance of the tube in the standard dynamic balance testing machine, without removing the filling material after giving the tube each incremental twist before satisfactory dynamic balance is attained, and as otherwise would be required. This of course, refers to twisting the tube while cold, and testing for dynamic balance after each full turn twist, or each fraction of a turn twist, as the case may be. For hot twisting of the tube, it will be essential in most instances, to remove the filling material, and allow the tube to cool prior to making the test for dynamic balance in the dynamic balance testing machine.

The compressive strength of the material will be a vital factor in the selection of the proper filling material, and unless the material can withstand, without any decrease in its own volume, all of the load imposed by the metal in the walls of the tube during the twisting operation, it is evident that the benefits derived from the twisting operation would be nullified by even a slight decrease in volume of the material. From this consideration, and especially where the number of turns of twisting is great, liquid filling material should be the preferable kind.

For twisting heated tubes, the available filling material consists of: Granular substances such as sand of various kinds and hard enough to withstand the heavy crushing loads to which the filling material will be subjected, solid materials, such as steel balls, steel or iron plugs which fit the bore of the tube, and which may be readily removed, fire clay, to fill the bore of the tube, and allowed to dry after being poured into place, and prior to heating the tube in the furnace, metals, which melt at lower temperatures than that to which the tube will be subjected, or an equal temperature if desirable in some cases, may be used with the proper means provided to retain the metal in the bore of the tube, and these include among other possible ones, lead, type metal, Babbitt metal, zinc, tin, etc.

For twisting cold tubes, any of the foregoing filling materials for heated tubes may be used, and in addition to these, most any liquid substance could be employed. Mercury would be very satisfactory, aside from the cost in the first place, and the cost of wastage. Oil and water, however, appear as the most suitable liquids. Oil is the better of the two, from the standpoint of the elimination of rust, and lubrication of the parts of the machine as well as the tubes being twisted. Water is the least expensive, and with provision for rust prevention, such as soda in solution, will serve the purpose very well.

For both classes of material above, the means employed to prevent loss of the filling material from within the bore of the tube, in the one case both in the tube heating furnace and also while subjected to the crushing stresses in the torsion machine, is of as vital importance as the selection of the proper filling material. It is apparent, that any escape of filling material would permit the walls of the tube to collapse, and therefore, this must be prevented by exercising proper precautions in designing the retaining means. Also there must be provision to prevent collapse of the tubes at the ends where they are gripped by the screws, or the jaws as the case may be, in the chucks of the torsion machine, and due to the pressure exerted when tightening the gripping screws, or jaws, and also the great force exerted at the tube ends during the twisting operation.

From the considerations outlined, the tubes always require end plugs to withstand the pressure of the gripping screws, or jaws, regardless of the character of the other tube filling material in the bore of the tube between the two end plugs. In the case of steel or iron filling plugs between the two end plugs, there is no need of an end plug tie rod, as the filling plugs easily sustain the compressive load imposed by the walls of the tube in a transverse direction to the axis of the tube, and as the filling plugs do not crush, there is no longitudinal pressure to sustain by the end plugs in maintaining the filling plugs in place. With granular filling material, steel balls, liquids, and with most of the metals used likewise, the end plugs would be subjected to excessive longitudinal pressure, beyond what the frictional resistance between the end plugs and the surface of the bore would stand, and hence the plugs require to be supported by tie rods which pass through bores in the end plugs, and the rod having a head on one end and a threaded portion with a nut thereon at the other end, and the rod passing through the bore of the tube and connecting both of the end plugs, the nut and head of the rod being outside at each end to facilitate attachment, and removal, of the rod. An example of means to facilitate the removal of metal plugs after the twisting operation, such as a key, or core rod will be given, though other variations besides this one are possible.

Fig. 36 shows an assembly of a cylindrical tubular shaft preparatory to the twisting operation, and provided with means to prevent collapse of the walls of the tube due to the forces set up therein while being twisted in the torsion machine. The outside surface of the tube is 1, and the surface of the bore is 2, the filling material is 3 which completely fills the space between the two flanged end filling plugs 4 the tie rod 6 and the bore surface, 2, and as shown in Fig. 44, which is a section at 44—44. The flanged end filling plugs 4 fit the surface 2 of the bore tightly, and have flanges 5 which are flush with the outside surface 1 of the tube and abut on the ends of the tube, and the bore 11 is a turning fit for the tie rod 6, and as shown in detail in Fig. 38 and Fig. 39. The tie rod 6 has a head 7 at one end, and a nut 8, which screws onto the threaded portion 8' at the other end thereof, as shown in Fig. 42 and Fig. 43. The filling material 3 may be composed of small steel balls, or granite gravel of equivalent size. The steel balls will serve for tubes which are heated, while the granite gravel is best used for cold tubes. Liquid filling material may be substituted for the material indicated, for cold working of the tubes, but with provisions, such as gaskets (not shown) between the flanges 5 of the end plugs 4 and the ends of the tube, and stuffing boxes (not shown) in the bore 11 of the end plugs 4 to fit around the tie rod 6, to prevent leakage of the liquid. Molten metal, such as lead, type metal, Babbitt metal, etc., may be used likewise for cold or hot working of the tubes, but with asbestos gaskets at the locations (not shown) as above indicated for liquid filling material.

Fig. 37 shows an assembly of a cylindrical tubular shaft preparatory to the twisting operation, and provided with means to prevent collapse of the walls of the tube due to the forces set up therein while being twisted in the torsion machine. The outside surface of the tube is 1, and the surface of the bore is 2, the filling material 9 completely fills the space between the two plain end filling plugs 10 the tie rod 6 and the surface 2 of the bore, as shown in Fig. 45, which is a section at 45—45. The plain end filling plugs 10 fit the surface 2 of the bore tightly, and the bore 12 is a turning fit for tie rod 6, and as shown in detail in Fig. 40 and Fig. 41. The tie rod 6 is shown in Fig. 42 and Fig. 43, as previously described. The filling material 9 may be fine crushed granite sand for cold working, or fire clay poured in while wet and allowed to dry for hot working, while molten lead, type metal, Babbitt metal, etc., may be used for either hot or cold working. But when the latter metals are used in tubes which are heated, asbestos packing in a stuffing box (not shown) will have to be provided on the filling plugs 10, both at the surface 2 of the bore of the tube and the bore 12 of the plug 10, to prevent leakage of the molten metal. The same provision of stuffing boxes will serve for liquid filling for cold working of the tubes. Oil, water, or mercury will serve as liquid filling material.

Fig. 46 shows, in section, an assembly of a cylindrical tubular shaft having conical portions at each end thereof tapering to smaller cylindrical ends, in the two chucks of the torsion machine, preparatory to the twisting operation, and provided with means to prevent collapse of the walls of the tube due to the forces set up therein while being twisted in the torsion machine. The outside surface of the tube is 24 and the bore is 25, and the liquid filling material is 26. The details of the torsion machine here referred to, are more fully described later for Fig. 63 to Fig. 66 inclusive. The stationary chuck is 27, and the torsion chuck is 28, and the tube is securely held in place in the chucks by the tube gripping screws 29. The removable bushings 30 serve to locate the axis of the outside surface 24 of the tube in coincidence with the axis of the chucks 27 and 28. The removable mandrels 31 are a tight fit in the bore 25 of the tube, and serve to prevent loss of liquid 26 by leakage, as well as prevent collapse of the walls of the tube at the ends, due to the pressure exerted by the screws 29, similar to the end filling plugs in Fig. 36 and Fig. 37. Mandrels 31 are a loose fit in the bore of the chucks 27 and 28, in order that the mandrels 31 offer no resistance to the location of the axis of the outside surface 24 of the tube in coincidence with the axis of the chucks 27 and 28 by the sole means of the bushings 30. The tapered bore chucking rings 35 serve to prevent loss of liquid 26 by leakage, and supports the leakage prevention means provided by the mandrels 31. The tubes have their ends chamfered circumferentially at 36 to form seats for the rings 35, and, as the chucks 27 and 28 are held in operating relation, longitudinally with the axis, by means later described, with great pressure being applied at the chamfered ends at 36 by the rings 35, a very efficient seal against leakage is thus obtained. It will be understood that the rings 36 could be made integral with mandrel 35, but the operating result would be identical. The bushings 30 have slots 37, provided at each of the screws 29 as shown, in order that the screws 29 will bear directly on the surface 24 of the tube. There are three such screws 29 for each of the chucks 27 and 28. The liquid 26, which may be either oil or water, is supplied from a source of hydraulic pressure, and the pressure is such as to adequately support the walls of the tube during the twisting operation, and prevent collapse thereof, due to the stresses set up therein as described.

Fig. 47 and Fig. 48 show an assembly of a cylindrical tubular shaft preparatory to the twisting operation, and provided with means to prevent collapse of the walls of the tube due to the forces set up therein while being twisted in the torsion machine. The outside surface of the tube is 1 and the surface of the bore is 2, and the filling material consists of tube end filling plugs 13 and short filling plugs 14 between the end plugs, so that the entire bore of the tube is filled. The end filling plugs 13 fit the surface 2 of the bore tightly, and are shown in detail in Fig. 51 and Fig. 52. The short filling plugs 14, likewise, fit the surface 2 of the bore tightly, and are shown in detail in Fig. 53 and Fig. 54. The plugs 13 and 14 are preferably made of steel, accurately machined all over, and may serve as tube filling material for both cold and heated tubes.

Fig. 49 and Fig. 50 show an assembly of a cylindrical tubular shaft preparatory to the twisting operation, and provided with means to prevent collapse of the walls of the tube due to the forces set up therein while being twisted in the torsion machine. The outside surface of the tube is 1, and the surface of the bore is 2, and the filling material consists of tube end split filling plugs 15 and short split filling plugs 16 between the end plugs, so that together with filling plug core rod 18 and end plug keys 17, the walls of the tube are supported fully. Small clearance space 20 is provided at each side of the plugs 15 to receive the keys 17, and for the plugs 16 likewise, to permit the easy removal of both plugs 15 and 16, when the core rod 18 and the keys 17 are previously removed from the bore of the tube. The tube end split filling plugs 15 fit the surface 2 of the bore of the tube tightly with core rod 18 and keys 17 in place, and are shown in detail in Fig. 59 and Fig. 60. The short split filling plugs 16, similarly as plugs 15, fit the surface 2 of the bore of the tube tightly with core rod 18 in place, and are shown in Fig. 55 and Fig. 56. The plugs 15 and 16 are made so that the spaces 20' are half of the space 20 in Fig. 49, as shown in the details of the plugs in Fig. 55, Fig. 56, Fig. 59, Fig. 60, the centers 21 of the surfaces of the bores 22 of the plugs being as shown. The core rod 18 fits the bores 22 of the plugs 15 and 16 accurately, so that the core rod 18 when assembled with plugs 15 and 16 in the bore of the tube is very tight, and may be removed from the assembly, after the twisting operation, by means of the head 19, and shown in detail in Fig. 61 and Fig. 62. The end split filling plug keys 17 are a tight fit in the space 20 between the plugs 15 at each side thereof, and relieve the pressure on the core rod 18 due to the pressure of the screws 29 in the chucks 27 and 28 of the torsion machine (see Fig. 64), the gib 23 being provided on each to permit the keys 17 to be readily withdrawn, and shown in detail in Fig. 57 and Fig. 58. The plugs 15 and 16, core rod 18, keys 17, are all made of steel accurately machined all over.

Fig. 63 shows a vertical fragmentary sectional side elevation at 63—63 of Fig. 64, but shown with liquid filling material for the cylindrical tubular shaft, similar to that illustrated in Fig. 46. All parts shown in Fig. 46 are shown here, with the exception that the tube shown here is cylindrical for its full length, and other related parts of the torsion machine are included. The outside surface of the tube is 24 and the bore is 25, the liquid filling material is 26. The tubular shaft is in the torsion machine preparatory to the twisting operation, and is held in stationary chuck 27, and torsion chuck 28, by the tube gripping screws 29. The removable bushings 30 serve to locate the axis of the outside surface 24 of the tube in coincidence with the axis of the chucks 27 and 28. The removable mandrels 31 are a tight fit in the bore 25 of the tube, and serve to prevent loss of the liquid 26 by leakage, as well as prevent collapse of the walls of the tube at the ends, due to the pressure exerted by the screws 29, similar to the end filling plugs in Fig. 36, Fig. 37, etc. Mandrels 31 are a loose fit in the bore of the chucks 27 and 28, in order that they offer no resistance to the location of the axis of the outside surface 24 of the tube in coincidence with the axis of the chucks 27 and 28 by the sole means of the bushings 30. The tapered bore chucking rings 35 serve to prevent loss of liquid 26 by leakage, which may seep past the mandrels 31. The tubes have their ends chamfered circumferentially at 36 to form seats for the rings 35, and thus provide a more effective liquid seal than if the tube ends are left plain. The chucking rings 35 are brought to bear on the ends of the tube with very great pressure, as the stationary chuck 27 is held in the operating position longitudinally with the axis of the chucks 27 and 28 with very great pressure by means of a piston operating in a cylinder, as later described. The mandrels 31 are held against endwise movement by collar nuts 32 and shoulders 33, and against rotation by means of keys 34. The bushings 30 have slots 37 provided at each of the screws 29 as shown, in order that the screws 29 will bear directly on the surface 24 of the tube ends. There are three such screws 29 for each of the chucks 27 and 28. The piston 38 and the piston rod 39, which operate in cylinder 40, actuate the stationary chuck head 41 by means of the arm 42, to which piston rod 39 is rigidly attached. The cylinder 40 is rigidly attached to base 43 of the machine by means of the two lugs 44 having screws (not shown) which are screwed into base 43 and on each side of cylinder 40. The piston 38 is actuated by air or liquid (water or oil) from a source of air or hydraulic pressure, which enters and leaves the cylinder 40 by the ports 45. The stationary chuck head 41 is movable parallel with the axis of the chucks 27 and 28 on the two ways 46 which are T shaped, and the gibs 47 which are bolted to head 41 slide on the under side of one side of the T, and there is one of the ways 46 on each side of the head 41 and cylinder 40 and are both part of the base 43. The two gibs 47 hold the head 41 on the ways 46, and thus constrain the head 41 to move parallel to the axis of the chucks 27 and 28, when the tube is entered into, or taken out of, the chucks. Likewise, the two tapered bore chucking rings 35 are thereby made to press against the chamfered ends of the tube in a true axial direction, and in alignment with the axis of the chucks 27 and 28. The chuck 27 has a spindle 48 integral therewith, and passing through the bore in the stationary chuck head 41, and held against endwise movement by the collar nut 49 and the shoulder 50, and against rotation by means of the two keys 51. The torsion chuck 28 has a spindle 52 integral therewith and passing through the bore of the torsion head 53 and running in bushings 54 which are pressed into the bore of the head 53. At the outer end of spindle 52 is attached rigidly by pressing into place, the torsion chuck drive gear 55 which is keyed in position against rotation by keys 56, which in conjunction with the shoulder 57 at the chuck end, prevents any endwise movement of the torsion chuck 28 and attached parts. The torsion head 53 is integral with the machine base 43. At the outer end of the stationary chuck spindle 48, and screwed into the mandrel 31, is pipe 58 connecting with the bore 59 of the mandrel 31 and with the valve 60 to regulate the flow of liquid 26 in and out of the bore 59 of the mandrel 31 and the bore 25 of the tube. The pipe 61 leads to a source of liquid pressure supply, or to a reservoir of spent liquid, and must have a flexible connection, such as a telescoping coupling (not shown) to a stationary pipe, in order to accommodate the reciprocatory movement of the stationary chuck head 41. At the outer end of the torsion chuck spindle 52, and screwed into the mandrel 31, is pipe 62 connecting with the bore 59 of the mandrel 31, and with the swivel elbow pipe coupling 63 attaching to valve 64 to regulate the flow of liquid 26 in and out of the bore 59 of the mandrel 31 and the bore 25 of the tube. The pipe 65, similarly with pipe 61, leads to a source of liquid pressure supply, or to a reservoir of spent liquid, as the case may be, depending upon where the pipe 61 leads to, as one of the pipes 61 and 65 is the supply pipe while the other is the discharge pipe. The gear 55 is actuated by means of rack 66, which is part of the mechanism described with Fig. 64, Fig. 65, Fig. 66. The dial 67 is graduated to read in fractions of a revolution of the torsion chuck 28, and is rigidly attached to torsion head 53. The indicator 68 is rigidly attached to the torsion chuck 28, and the point thereof passes over the graduations on the dial 67, and serves as a means of indicating the angular rotational movement of the torsion chuck 28 from the initial position, or also beyond a given number of full revolutions. For more than one revolution of torsion chuck 28, a standard revolution counter (not shown), and actuated by the indicator 68, and rigidly attached to the torsion head 53, may be used. The rack 66 may be made of such length, as to provide for more than one revolution of gear 55. Or a ratchet wheel attached rigidly to spindle 52, and having gear 55 rotatably mounted on the spindle 52 alongside the ratchet wheel and outside of same, and gear 55 carrying a pawl to engage with the ratchet wheel (not shown) and teeth thereon, and the reciprocating movement of the rack 66 being such as to give the gear 55 meshing therewith with the pawl a definite movement and so engage a definite number of teeth in the ratchet wheel, and thereby would provide a means for securing an unlimited number of revolutions to torsion chuck 28.

Referring to Fig. 64 to Fig. 66 inclusive, there is shown a torsion machine adapted to twisting tubular shafts, and prepared for the twisting operation by means shown in Fig. 36, Fig. 37, Fig. 47, Fig. 48, Fig. 49, Fig. 50, and fully described before, and therefore adapted to twisting tubes which are heated, or which are cold (meaning the room temperature). Fig. 65 is a fragmentary side elevation at 65—65 of Fig. 64. The cylindrical tubular shaft, with outside surface 1 and bore 2, is held in stationary chuck 27 and torsion chuck 28, and securely clamped in place by the tube gripping screws 29, which bear directly upon the surface 1 of the tube by passing through slots 37 (see Fig. 46 and Fig. 63 for these) in the bushings 30. The removable bushings 30 serve to locate the axis of the outside surface 1 of the tube in coincidence with the axis of the chucks 27 and 28. The stationary chuck head 41 is movable on the ways 46, one on each side of head 41, and parallel with the axis of the chucks 27 and 28. The ways 46 are integral with the machine base 43, and are T-shaped, and two gibs 47 bolted one on each side of head 41, slide on the under side of and to one side of the T, and thus constrain the head 41 to move parallel to the axis of the chucks 27 and 28, when the tube is entered into, or taken out of, the chucks. The head 41 is moved along the ways 46 by manual means. A rack 69 is rigidly attached, teeth upward, to one of the ways 46, and on one side and inner edge thereof, and meshing therewith is a pinion 70 rigidly mounted on shaft 71 which turns in bearing 72 which is integral with head 41. The shaft 71 has a square milled end 73 to receive a crank handle (not shown), to enable the operator to turn the shaft 71, and thus, by tooth engagement between the pinion 70 and rack 69, to cause pinion 70 to move over the rack 69 in a longitudinal direction, and so cause the head 41 to move over the ways 46. The shaft 71 may be clamped by means (not shown) of a clamp screw through the bearing 72 to bear upon the shaft 71, or by means of a nut (not shown) on a threaded portion of shaft 71 at the squared end 73 thereof, and bearing against the end of bearing 72 at that point, and with the pinion 70 at the other end, thus clamp onto the bearing 72, and so forbid movement of the pinion 70 over the rack 69, and thereby secure means of preventing movement of the head 41 over the ways 46, and involuntarily to the operator. Other more positive means, such as clamping the gibs 47 by means of a screw fixed in the gibs, and having a nut with operating handle at the opposite end, and passing through the portion of the head 41 directly over the gibs 47, and thus clamping the head 41 in position, are easily applied, but not shown. The chuck 27 has a spindle 48 integral therewith, passing through the bore in the stationary chuck head 41, and held against endwise movement by the collar nut 49 and shoulder 50, and against rotation by the two keys 51. The spindle 48 has a bore 74, which permits the entrance of the tubular shaft into the chucks 27 and 28 from the rear of the head 41, without moving the head 41 along the ways 46 by hand, as would otherwise be required. The torsion chuck 28 has a spindle 52, integral therewith, passing through the bore of the torsion head 53, and running in the bushed bearings 54 pressed into the bore of the head 53. At the outer end of the spindle 52 is attached the torsion chuck drive gear 55 by means of two keys 56, which in conjunction with shoulder 57, at the chuck end, prevents any endwise movement of the torsion chuck 28 and attached parts. The torsion head 53 is integral with the machine base 43. The gear 55 is actuated by means of rack 66 which meshes therewith, and the rack 66 moves in ways 75 which are integral with base 43. The rack 66 is integral with the piston rod 76, which is rigidly attached to piston 77. The rack 66, piston rid 76, and piston 77, are actuated to have a reciprocatory movement by air, or liquid, under pressure in cylinder 78, which is integral with machine base 43. The air, or liquid, under pressure, enters and leaves the cylinder 78 by means of pipes 79, which lead to an operating valve (not shown), by which the movement of the rack 66, rod 76, and piston 77, are controlled by the operator. The valve above, and not shown, is connected to a source of air or hydraulic pressure, and convenient to the operator. The dial 67 is graduated to read in fractions of a revolution of the torsion chuck 28, and is rigidly attached to the torsion head 53. The indicator 68 is rigidly attached to the torsion chuck 28, and the point thereof passes over the graduations on the dial 67, and serves as a means of indicating the angular rotational movement of the torsion chuck 28 from the initial position thereof, or also beyond a given number of full revolutions. For more than one revolution of the torsion chuck 28, a standard revolution counter (not shown), and actuated by the indicator 68, and rigidly attached to the torsion head 53, may be used. The rack 66 may be of such length, as to provide for more than one revolution of gear 55. Or a ratchet wheel attached rigidly to spindle 52, and having gear 55 rotatably mounted on the spindle 52 alongside the rachet wheel and outside of same, and gear 55 carrying a pawl pivotally mounted thereon, to engage with the teeth of the ratchet wheel (not shown), and the reciprocating movement of the rack 66 being such as to give the gear 55 meshing therewith a definite movement, and thus the pawl will engage a definite number of teeth of the ratchet wheel, and thus would provide a means of securing an unlimited number of revolutions to the torsion chuck 28. The rack stop 80 is integral with rack 66, and abuts on the adjustable stop 81, for accurately gaging the movement of the rack 66, and thereby the rotational movement to the gear 55 and torsion chuck 28, and finally the amount of twisting imposed on the tube thus being dynamically balanced. The adjustable stop 81 is adjusted by means of screw 82, which has a milled square end 83, which is adapted to receive a crank handle (not shown), for manual turning of the screw 82, and thus secure adjustment of the stop 81.

A summary of the method, is as follows:

As it is impossible to make lengthy examinations of each tube to determine which class of divergency of the axes exists, all the tubes are put through the same routine in dynamically balancing them.

The tube is held firmly in position in two chucks, as previously described, one at each end of the tube, in a specially adapted torsion machine, and twisted about the axis of the outside surface of the tube. The tube bore is filled with suitable filling material, as described, to support the walls against collapse, either before being placed in the torsion machine, or else by means incorporated in the machine itself while the tube is in place and prior to twisting the tube. The axis of the outside surface of the tube is chosen, for the reason that the tubular shaft must have its outside surface run true with the axis of rotation.

The short portion at the ends of the tube which remains untwisted, due to being held in the chucks of the torsion machine, is permitted to stay in place on the tube, as the amount of unbalance contributed thereby to the tubular shaft is insignificant. Furthermore, if it should be desired to provide for a small additional balance to overcome the effect due to the short end portions of the tube which are untwisted, a small fraction of a turn additional twist to the tube will easily accomplish the desired betterment in dynamic balance. For the above reasons, the tube may be cut to finished length prior to the twisting operation, and also chamfered at each end for the purpose of preventing any leakage where liquid filling material is used.

The tube will be twisted through one turn of 360 deg., and will be then tested for dynamic balance in a standard dynamic balancing machine, and of course, with the filling material removed from the bore of the tube. If the tube runs in dynamic balance in the test, then it is ready for attachment to the universal joints, and for use as a tubular shaft. If it does not run in balance, however, in the test, then it is given an additional twist through one turn of 360 deg., and in the identical manner as for the first twist, and again tested for dynamic balance as before. If still not in dynamic balance, then it is to be twisted through successive turns of 360 deg., and tested alternately, until the desired degree of dynamic balance has been secured. For close dynamic balancing, fractional parts of a turn will probably be the best after the first full turn twist, as pointed out in the description of the various classes of tubes, and also provided for in the torsion machine shown herewith.

The above procedure would apply to small quantity dynamic balancing. For large production of tubes, the procedure would have to be modified to eliminate as much of the handling as possible. Therefore, the tubes would, in this case, be twisted through one turn of 360 deg. for the entire large quantity, without making any tests for balance until later. The testing for balance would likewise be made for the large quantity, those in balance being ready for the assembly, while those not in balance being held for further twisting. Those not in balance, would then preferably be given twists of a fractional part of a turn, also in large quantity, before making any tests for balance, as before, until the whole quantity is balanced.

Due to the methods of supporting the walls of the tubes to prevent collapse thereof during the twisting operation, the outside surface of tubes of circular cross section will be maintained in the same form, and the same dimensions transversely and in length, as existed prior to twisting them in order to secure dynamic balance thereof. Likewise, for all tubes which may be dynamically balanced by the twisting method as described previously, the distance between the two axes of the tubes, measured on perpendiculars to the axis of the outside surface, from this latter axis to the axis of the bore, will be the same after twisting as before twisting. But, in each tube, the disposition of the axis of the bore about the axis of the outside surface, and also the surface of the bore about the axis of the outside surface, will be greatly altered and will be helical. The axis of the outside surface of each tube is thus made to become a new gravity axis for the surface of the bore, and as it already was for the outside surface, and the metal of the walls is thus embraced between two surfaces having a common gravity axis and is in equilibrium about this axis, and, consequently, the tube is in dynamic balance about this axis.

The means indicated for twisting tubular shafting, and likewise the means indicated for supporting the walls of the tubular shafting during the twisting operation to prevent collapse of the walls thereof, are shown in the most elementary form, and it is understood that I do not limit myself to the means shown herein, for twisting tubular shafts and supporting the walls thereof during the twisting operation for the purpose indicated, and for the purpose of securing dynamic balance of tubular shafts by twisting them about the axis of the outside surface of the said tubular shafts.

What I claim is:

1. A dynamically balanced tubular shaft of shaft-length for transmission of power purposes and having the lateral sections of the outside surface thereof symmetrical with the longitudinal axis of rotation thereof, and the lateral sections of the surface of the bore thereof symmetrical with the longitudinal axis of the said surface of the bore thereof non-coincident with the said longitudinal axis of rotation thereof, and the metal of the walls thereof contained between the said outside surface thereof and the said surface of the bore thereof of non-uniform thickness and irregularly helically disposed about the said longitudinal axis of rotation thereof, substantially as described.

2. A dynamically balanced tubular shaft of shaft-length for transmission of power purposes and having the lateral sections of the circular cylindrical outside surface thereof symmetrical with the longitudinal axis of rotation thereof, and the lateral sections of the surface of the bore thereof of circular form symmetrical with the longitudinal axis of the said surface of the bore thereof non-coincident with the said longitudinal axis of rotation thereof, and the metal of the walls thereof contained between the said outside surface thereof and the said surface of the bore thereof of non-uniform thickness and irregularly helically disposed about the said longitudinal axis of rotation thereof, substantially as described.

3. A dynamically balanced tubular shaft of shaft-length for transmission of power purposes and having the lateral sections of the circular cylindrical outside surface thereof symmetrical with the longitudinal axis of rotation thereof, and the lateral sections of the surface of the bore thereof of circular form symmetrical with the longitudinal axis of the said surface of the bore thereof disposed irregularly about the said longitudinal axis of rotation thereof, and the metal of the walls thereof contained between the said outside surface thereof and the said surface of the bore thereof of non-uniform thickness and twisted about the said longitudinal axis of rotation thereof, substantially as described.

4. A dynamically balanced tubular shaft of shaft-length for transmission of power purposes and having the lateral sections of the circular cylindrical outside surface thereof symmetrical with the longitudinal axis of rotation thereof, and the lateral sections of the surface of the bore thereof of circular form symmetrical with the longitudinal axis of the said surface of the bore thereof composed of lengths of axis coincident with the said longitudinal axis of rotation thereof and of other lengths of axis non-coincident with and irregularly helically disposed about the said longitudinal axis of rotation thereof, and the metal of the walls thereof contained between the said outside surface thereof and the said surface of the bore thereof of non-uniform thickness and twisted about the said longitudinal axis of rotation thereof, substantially as described.

5. The method of dynamically balancing tubular shafts of shaft-length for transmission of power purposes made from suitable tubes having walls of non-uniform thickness consisting in twisting each tube about the longitudinal axis of the outside surface thereof through the predetermined permanently maintained angle with reference to and about the said longitudinal axis thereof required for dynamically balancing the shaft-length tubular shaft made therefrom about the said longitudinal axis thereof, and in supporting the metal of the walls thereof during the twisting operation thereon to prevent destructive distortion of the said metal thereof and changes in the lateral sectional form and dimensions of the said outside surface thereof which would otherwise occur, and in cutting the said shaft-length tubular shaft therefrom after the said twisting operation thereon.

6. The method of dynamically balancing tubular shafts of shaft-length for transmission of power purposes made from suitable tubes having walls of non-uniform thickness consisting in twisting each tube by turning one end thereof with respect to the opposite end thereof about the longitudinal axis of the outside surface thereof through the predetermined permanently maintained angle with reference to and about the said longitudinal axis thereof required for dynamically balancing the shaft-length tubular shaft made therefrom about the said longitudinal axis thereof, and in supporting the metal of the walls thereof during the twisting operation thereon to prevent destructive distortion of the said metal thereof and changes in the lateral sectional form and dimensions of the said outside surface thereof which would otherwise occur, and in cutting off each end thereof to make the said shaft-length tubular shaft therefrom after the said twisting operation thereon.

7. The method of dynamically balancing tubular shafts of shaft-length for transmission of power purposes made from suitable circular cylindrical tubes having walls of non-uniform thickness consisting in twisting each tube by turning one end thereof with respect to the opposite end thereof about the longitudinal axis of the outside surface thereof through the predetermined permanently maintained angle with reference to and about the said longitudinal axis thereof required for dynamically balancing the shaft-length tubular shaft made therefrom about the said longitudinal axis thereof, and in supporting the metal of the walls thereof during the twisting operation thereon to prevent destructive distortion of the said metal thereof and changes in the lateral sectional form and dimensions of the said outside surface thereof which would otherwise occur, and in cutting off each end thereof to make the said shaft-length tubular shaft therefrom after the said twisting operation thereon.

8. The method of dynamically balancing tubular shafts of shaft-length for transmission of power purposes made from suitable tubes having walls of non-uniform thickness consisting in twisting each tube by turning one end thereof with respect to the opposite end thereof about the longitudinal axis of the outside surface thereof through the predetermined permanently maintained angle with reference to and about the said longitudinal axis thereof required for dynamically balancing the shaft-length tubular shaft made therefrom about the said longitudinal axis thereof, and in supporting the metal of the walls thereof during the twisting operation thereon to prevent destructive distortion of the said metal thereof and changes in the lateral sectional form and dimensions of the said outside surface thereof which would otherwise occur.

9. The method of dynamically balancing tubular shafts of shaft-length for transmission of power purposes made from suitable circular cylindrical tubes having walls of non-uniform thickness consisting in twisting each tube by turning one end thereof with respect to the opposite end thereof about the longitudinal axis of the outside surface thereof through the predetermined permanently maintained angle with reference to and about the said longitudinal axis thereof required for dynamically balancing the shaft-length tubular shaft made therefrom about the said longitudinal axis thereof, and in supporting the metal of the walls thereof during the twisting operation thereon to prevent destructive distortion of the said metal thereof and changes in the lateral sectional form and dimensions of the said outside surface thereof which would otherwise occur.

10. The method of dynamically balancing tubular shafts of shaft-length for transmission of power purposes made from suitable circular cylindrical tubes having walls of non-uniform thickness consisting in twisting each tube about the longitudinal axis of the outside surface thereof through the predetermined permanently maintained angle with reference to and about the said longitudinal axis thereof required for dynamically balancing the shaft-length tubular shaft made therefrom about the said longitudinal axis thereof, and in supporting the metal of the walls thereof during the twisting operation thereon to prevent destructive distortion of the said metal thereof and changes in the lateral sectional form and dimensions of the said outside surface thereof which would otherwise occur, and in cutting the said shaft-length tubular shaft therefrom after the said twisting operation thereon.

11. The method of dynamically balancing tubular shafts of shaft-length for transmission of power purposes made from suitable circular cylindrical tubes having walls of non-uniform thickness consisting in twisting each tube about the longitudinal axis of the outside surface thereof through the predetermined permanently maintained angle with reference to and about the said longitudinal axis thereof required for dynamically balancing the shaft-length tubular shaft made therefrom about the said longitudinal axis thereof, and in supporting the metal of the walls thereof from within the bore thereof during the twisting operation thereon to prevent destructive distortion of the said metal thereof and changes in the lateral sectional form and dimensions of the said outside surface thereof which would otherwise occur, and in cutting the said shaft-length tubular shaft therefrom after the said twisting operation thereon.

12. The method of dynamically balancing tubular shafts of shaft-length for transmission of power purposes made from suitable circular cylindrical tubes having walls of non-uniform thickness consisting in twisting each tube by turning one end thereof with respect to the opposite end thereof about the longitudinal axis of the outside surface thereof through the predetermined permanently maintained angle with reference to and about the said longitudinal axis thereof required for dynamically balancing the shaft-length tubular shaft made therefrom about the said longitudinal axis thereof, and in supporting the metal of the walls thereof from within the bore thereof during the twisting operation thereon to prevent destructive distortion of the said metal thereof and changes in the lateral sectional form and dimensions of the said outside surface thereof which would otherwise occur.

13. The method of dynamically balancing tubular shafts of shaft-length for transmission of power purposes made from suitable circular cylindrical tubes having walls of non-uniform thickness consisting in twisting each tube by turning one end thereof with respect to the opposite end thereof about the longitudinal axis of the outside surface thereof through the predetermined permanently maintained angle with reference to and about the said longitudinal axis thereof required for dynamically balancing the shaft-length tubular shaft made therefrom about the said longitudinal axis thereof, and in supporting the metal of the walls thereof from within the bore thereof during the twisting operation thereon to prevent destructive distortion of the said metal thereof and changes in the lateral sectional form and dimensions of the said outside surface thereof which would otherwise occur, and in cutting off each end thereof to make the said shaft-length tubular shaft therefrom after the said twisting operation thereon.

14. A torsion machine adapted to twist tubes for the described purpose having, in combination, a machine base, a pair of tube gripping chucks suitably mounted on the said base adapted to be longitudinally coaxially spaced to suit the tube to be twisted, means associated with the said base adapted to relatively rotatably drive the said pair of chucks about the common longitudinal axis of the said pair of chucks in either direction of rotation, means associated with the said driving means adapted to restrict the said driving means to relatively rotatably drive the said pair of chucks about the said common longitudinal axis of the said pair of chucks in either direction of rotation through only the predetermined required angle of rotation, means associated with the said pair of chucks and the said tube adapted to locate the outside surface of the said tube longitudinally coaxially with the said common longitudinal axis of the said pair of chucks, means associated with the said pair of chucks and the said tube adapted to support the metal of the walls of the said tube during the twisting operation on the said tube.

15. A torsion machine adapted to twist tubes for the described purpose having, in combination, a machine base, a pair of tube gripping chucks comprising a rotatably mounted torsion chuck and a non-rotatably mounted stationary chuck on the said base adapted to be longitudinally coaxially spaced to suit the tube to be twisted, means associated with the said base adapted to rotatably drive the said torsion chuck about the common longitudinal axis of the said pair of chucks in either direction of rotation, means associated with the said driving means adapted to restrict the said driving means to rotatably drive the said torsion chuck about the said common longitudinal axis of the said pair of chucks in either direction of rotation through only the predetermined required angle of rotation, means associated with the said pair of chucks and the said tube adapted to locate the outside surface of the said tube longitudinally coaxially with the said common longitudinal axis of the said pair of chucks, means associated with the said pair of chucks and the said tube adapted to support the metal of the walls of the said tube during the twisting operation on the said tube.

16. A torsion machine adapted to twist tubes for the described purpose having, in combination, a machine base, a pair of tube gripping chucks comprising a torsion chuck rotatably mounted in a fixed bearing on the said base and a stationary chuck rigidly mounted on a carriage longitudinally movably mounted on ways on the said base, means associated with the said base and the said carriage adapted to longitudinally reciprocably move the said carriage on the said ways to longitudinally coaxially space the said stationary chuck relative to the said torsion chuck to suit the tube to be twisted, means associated with the said base and the said carriage adapted to hold the said carriage on the said ways in a fixed position to hold the said stationary chuck in fixed coaxial spaced relation to said torsion chuck to suit the said tube, means associated with the said base adapted to rotatably drive the said torsion chuck about the common longitudinal axis of the said pair of chucks in either direction of rotation, means associated with the said driving means adapted to restrict the said driving means to rotatably drive the said torsion chuck about the said common longitudinal axis of the said pair of chucks in either direction of rotation through only the predetermined required angle of rotation, means associated with the said pair of chucks and the said tube adapted to locate the outside surface of the said tube longitudinally coaxially with the said common longitudinal axis of the said pair of chucks, means associated with the said pair of chucks and the said tube comprising tube-end supporting means at each end of the said tube and intermediate tube supporting means between the said tube-end supporting means at the said each end of the said tube adapted to support the metal of the walls of the said tube during the twisting operation of the said tube.

17. A torsion machine as claimed in claim 16, wherein the said pair of chucks have each a longitudinally coaxial bore connected on the non-adjacent side of each to the bore of each of a pair of longitudinally coaxially rigidly connected tubular chuck spindles, the said chuck spindle of the said torsion chuck is rotatably mounted in the said fixed bearing on the said base and has a coaxially rigidly connected gear on the end opposite the said torsion chuck rotatably driven by the said driving means cooperably connected to the said gear, the said chuck spindle of the said stationary chuck is rigidly mounted in a bearing rigidly connected to the said carriage, the said pair of chucks have each tube gripping means cooperably connected therewith adapted to rigidly grip each end of the said tube within each said chuck bore respectively, the said locating means comprises a pair of means cooperably connected to each of the said pair of chucks within the said chuck bore of each respectively adapted to be cooperably connected to the outside surface of the said each end of the said tube respectively, the said tube-end supporting means consists of a pair of replaceable tube bore mandrels each non-rotatably longitudinally rigidly laterally self-adjustably connected within each said chuck bore and said spindle bore of each of the said pair of chucks respectively having liquid channel means extending longitudinally through each to suitably connected liquid valve means non-adjacent to each other adapted to fit tightly sealingly within the bore of the said each end of the said tube respectively, the said intermediate tube supporting means consists of pressure liquid from a suitable source connected by suitable piping means to the said valve means of the said pair of tube bore mandrels adapted to flow through the said valve means and through either of the said liquid channel means of the said pair of tube bore mandrels selectively into the bore of the said tube and to completely fill the said bore of the said tube between the said pair of tube bore mandrels at the said each end of the said tube and to be entrapped therein when the said valve means are opened and are closed respectively.

18. A torsion machine as claimed in claim 16, wherein the said carriage moving means and the said carriage holding means consist of a single pressure fluid actuable mechanism comprising an actuable part and a cooperably connected non-actuable part, the said actuable part is rigidly connected to the said carriage, the said non-actuable part is rigidly connected to the said base and has suitably connected piping means for conveying pressure fluid means thereto from a source of pressure fluid means and for conveying the spent pressure fluid means therefrom and suitable valve means suitably connected to the said piping means for controlling the said pressure fluid means in exerting pressure in either direction on the said actuable part to longitudinally reciprocably actuate the said actuable part relatively thereto longitudinally parallel to the said common longitudinal axis of the said pair of chucks thereby to longitudinally reciprocably move the said carriage on the said ways and in exerting pressure in one direction toward the said torsion chuck on the said actuable part to hold the said actuable part in a fixed position relatively thereto thereby to hold the said carriage on the said ways in a fixed position.

JOHN B. WINTERCORN.